(12) United States Patent
Lee et al.

(10) Patent No.: US 9,395,833 B2
(45) Date of Patent: Jul. 19, 2016

(54) METHOD AND APPARATUS FOR CONTROLLING LOCK OR UNLOCK IN PORTABLE TERMINAL

(71) Applicant: Samsung Electronics Co., Ltd., Gyeonggi-do (KR)

(72) Inventors: Yohan Lee, Gyeonggi-do (KR); Jaehyeon Kang, Gyeonggi-do (KR); Youngeun Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/338,964

(22) Filed: Jul. 23, 2014

(65) Prior Publication Data

US 2015/0035770 A1    Feb. 5, 2015

(30) Foreign Application Priority Data

Jul. 30, 2013    (KR) .......................... 10-2013-0090364

(51) Int. Cl.
*G06F 3/041*    (2006.01)

(52) U.S. Cl.
CPC ...................................... *G06F 3/041* (2013.01)

(58) Field of Classification Search
CPC ..... G06F 3/041; G06F 1/1647; G06F 1/1692; G06F 2203/04804
See application file for complete search history.

(56) References Cited

U.S. PATENT DOCUMENTS

| 8,810,524 | B1 * | 8/2014 | Rosenberg | ............ | G06F 1/1643 345/1.1 |
| 2006/0197750 | A1 * | 9/2006 | Kerr | ...................... | G06F 1/1626 345/173 |
| 2007/0150842 | A1 | 6/2007 | Chaudhri et al. | | |
| 2009/0298547 | A1 * | 12/2009 | Kim | ..................... | H04W 52/027 455/566 |
| 2010/0056220 | A1 * | 3/2010 | Oh | ......................... | G06F 1/1616 455/566 |
| 2011/0163986 | A1 * | 7/2011 | Lee | ....................... | G06F 1/1692 345/173 |
| 2011/0242103 | A1 | 10/2011 | Han et al. | | |
| 2012/0060089 | A1 | 3/2012 | Heo et al. | | |
| 2012/0223890 | A1 | 9/2012 | Borovsky et al. | | |

(Continued)

FOREIGN PATENT DOCUMENTS

KR    1020110111605    10/2011

OTHER PUBLICATIONS

International Search Report dated Nov. 27, 2014 issued in counterpart application No. PCT/KR2014/006700.

*Primary Examiner* — Christopher E Leiby
(74) *Attorney, Agent, or Firm* — The Farrell Law Firm, P.C.

(57) ABSTRACT

A method and an apparatus for controlling to lock or unlock in the portable terminal having a transparent display that has two display surfaces and is capable of double-sided touch input and double-sided display is provided. The method includes activating the transparent display according to a lock state or an unlock state of the transparent display; displaying a lock or unlock area, which notifies whether a display surface is locked, in a preset area of at least one of display surfaces of the transparent display; and changing the lock state or the unlock state of the at least one of the display surfaces of the transparent display and displaying whether the changed state is the lock state or the unlock state in the lock or unlock area of the at least one display surface, when a touch input is received in the lock or unlock area.

18 Claims, 42 Drawing Sheets

(56) References Cited

U.S. PATENT DOCUMENTS

| | | | |
|---|---|---|---|
| 2012/0306927 A1* | 12/2012 | Lee | G06F 3/041 345/660 |
| 2014/0035794 A1* | 2/2014 | Chen | G06F 3/1431 345/1.3 |
| 2014/0045553 A1* | 2/2014 | Shimada | G06F 3/041 455/566 |
| 2014/0168118 A1* | 6/2014 | Wang | G06F 3/03547 345/173 |
| 2014/0191970 A1* | 7/2014 | Cho | G06F 3/0488 345/163 |
| 2014/0208269 A1* | 7/2014 | Boyana | H04M 1/66 715/835 |
| 2014/0210708 A1* | 7/2014 | Simmons | G09G 5/32 345/156 |
| 2014/0218314 A1* | 8/2014 | Kim | G06F 1/1654 345/173 |
| 2015/0011263 A1* | 1/2015 | Itamoto | G06F 3/0488 455/566 |

* cited by examiner

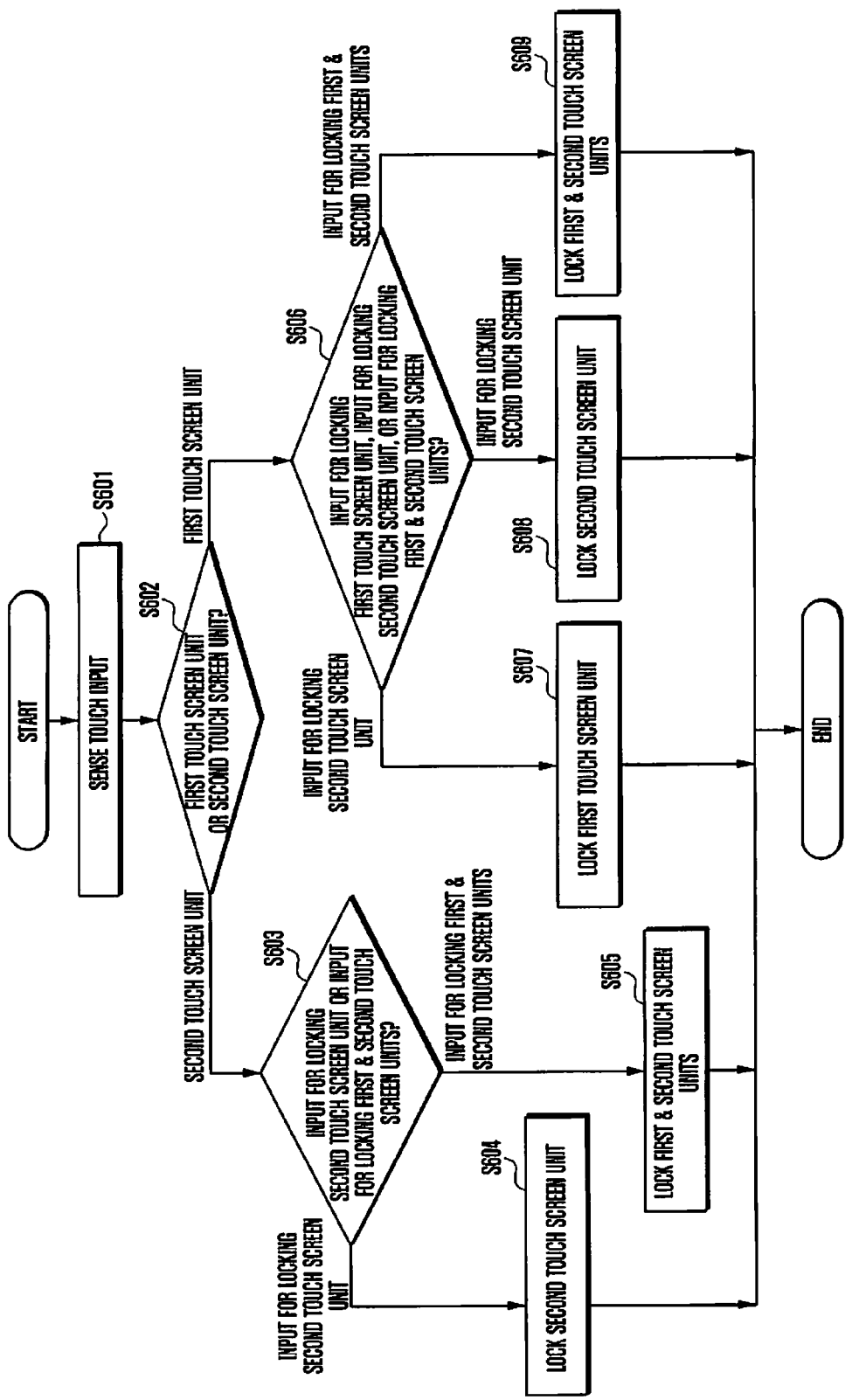

METHOD AND APPARATUS FOR CONTROLLING LOCK OR UNLOCK IN PORTABLE TERMINAL

PRIORITY

This application claims priority under 35 U.S.C. §119(a) to Korean Patent Application No. 10-2013-0090364, filed in the Korean Intellectual Property Office on Jul. 30, 2013, the entire content of which is incorporated herein by reference.

BACKGROUND OF THE INVENTION

1. Field of the Invention

The present invention generally relates to a method and an apparatus for controlling lock or unlock in a portable terminal, and more particularly, to a method and an apparatus, which in a portable terminal having a transparent display, can control the lock or unlock of each of a touch screen on a front surface of the portable terminal and a touch screen on a rear surface thereof and can control a corresponding transparency according to the lock or unlock of each of the touch screen on the front surface of the portable terminal and the touch screen on the rear surface thereof.

2. Description of the Related Art

Portable terminal devices include, for example, Personal Digital Assistants (PDAs), navigation devices, laptop computers, mobile phones, and the like. Portable terminals make use of display devices such as a Liquid Crystal Display (LCD), Organic Light Emitting Diodes (OLEDs), and the like.

A touch screen capable of receiving an input on a display screen thereof is widely used. Various display elements to be applied to next-generation display devices have been developed and are undergoing testing, or are being developed.

Recently, a transparent display device called a Transparent Organic Light Emitting Diode (TOLED) has been developed, and research is being conducted for applying TOLEDs to various devices, such as the dashboard of an automobile, a display of a portable terminal, a virtual reality device having the shape of eyeglasses, and the like.

Typically, a touch screen is used in a transparent display device applied to the portable terminal such as a mobile phone, and a touch screen is applied to both-side surfaces or one side surface of the transparent display device. When one side surface is used in the transparent display device, stability is high, but it is difficult to intuitively distinguish a surface enabling a touch from the other, and an input is performed on only one side surface. Accordingly, when characters and the like are input, there are disadvantages, such as a reduced input speed, and the like. Also, a User Interface (UI) using a three-dimensional (3D) screen in the transparent display device is recently introduced. However, a scheme for touching only one side surface is disadvantageous in that the user has difficulty in controlling the UI using a 3D screen. In order to overcome this disadvantage, portable terminal products are released, each of which includes a transparent display device, of which a touch screen is applied to both side surfaces.

When a touch input is allowed on both sides of a screen of the transparent display device, a 3D screen, a 3D application, and the like, can be more widely utilized by using a touch on each of the both sides of the screen. However, when a touch input is used on the both sides of the screen, a malfunction may occur. It is also necessary to efficiently, easily and conveniently configure the lock or unlock of the both sides of the screen and increase the availability of the transparent display device.

When the user grips and uses the portable terminal having the transparent display of which a touch screen is applied to both side surfaces, in the portable terminal having the transparent display, the touch screen touched by a palm of a hand of the user who grips the portable terminal may malfunction regardless of the intention of the user.

When both side surfaces of the portable terminal having the transparent display operate as the touch screen, the transparent display has a problem in that the user has difficulty in distinguishing one side surface in a lock state from the other in an unlock state among both side surfaces of the transparent display.

SUMMARY OF THE INVENTION

The present invention has been made to address at least the above-mentioned problems and/or disadvantages and to provide at least the advantages described below. Accordingly, an aspect of the present invention provides a method and an apparatus for controlling to lock or unlock in a portable terminal, in which a user can conveniently set the lock or unlock of touch screens on both sides of a transparent display or that of a touch screen on any one side thereof.

Another aspect of the present invention provides a method and an apparatus for controlling to lock or unlock in a portable terminal having a transparent display, which can automatically change a touch surface of the portable terminal, that a user grips and contacts, to a lock state and can remove a malfunction of the transparent display.

Another embodiment of the present invention provides a method and an apparatus for controlling lock or unlock in a portable terminal, which can adjust a corresponding transparency according to the lock and unlock of a display of the portable terminal and thereby, enable a user to intuitively and easily know whether the display of the portable terminal is set to the lock or unlock.

In accordance with an aspect of the present invention, a method for controlling to lock or unlock in a portable terminal having a transparent display capable of double-sided touch input and double-sided display is provided. The method includes activating the transparent display according to a lock state or an unlock state of the transparent display; displaying a lock or unlock area, which notifies whether a display surface is locked, in a preset area of at least one of display surfaces of the transparent display; and changing the lock state or the unlock state of the at least one of the display surfaces of the transparent display and displaying whether the changed state is the lock state or the unlock state in the lock or unlock area of the at least one display surface, when a touch input is received in the lock or unlock area.

In accordance with another aspect of the present invention, an apparatus for controlling to lock or unlock in a portable terminal is provided. The apparatus includes a transparent display that has two display surfaces and is capable of double-sided touch input and double-sided display; and a control unit configured to read the lock state or the unlock state of the transparent display from the memory, to activate the transparent display according to the lock state and the unlock state of the transparent display, to display a lock or unlock area, which notifies whether a display surface is locked, in a preset area of at least one of the display surfaces of the transparent display, and to change the lock state or the unlock state of the at least one of the display whether the changed state is the lock state or the unlock state in the lock or unlock area of the at least one display surface, when a touch input is received in the lock or unlock area.

BRIEF DESCRIPTION OF THE DRAWINGS

The above and other aspects, features and advantages of the present invention will be more apparent from the following detailed description, taken in conjunction with the accompanying drawings, in which:

FIG. 6 is a flowchart illustrating a process for performing lock/unlock processing according to a user input in lock/unlock states illustrated in FIG. 2, according to a fourth embodiment of the present invention;

DETAILED DESCRIPTION OF EMBODIMENTS OF THE PRESENT INVENTION

Figure 1:
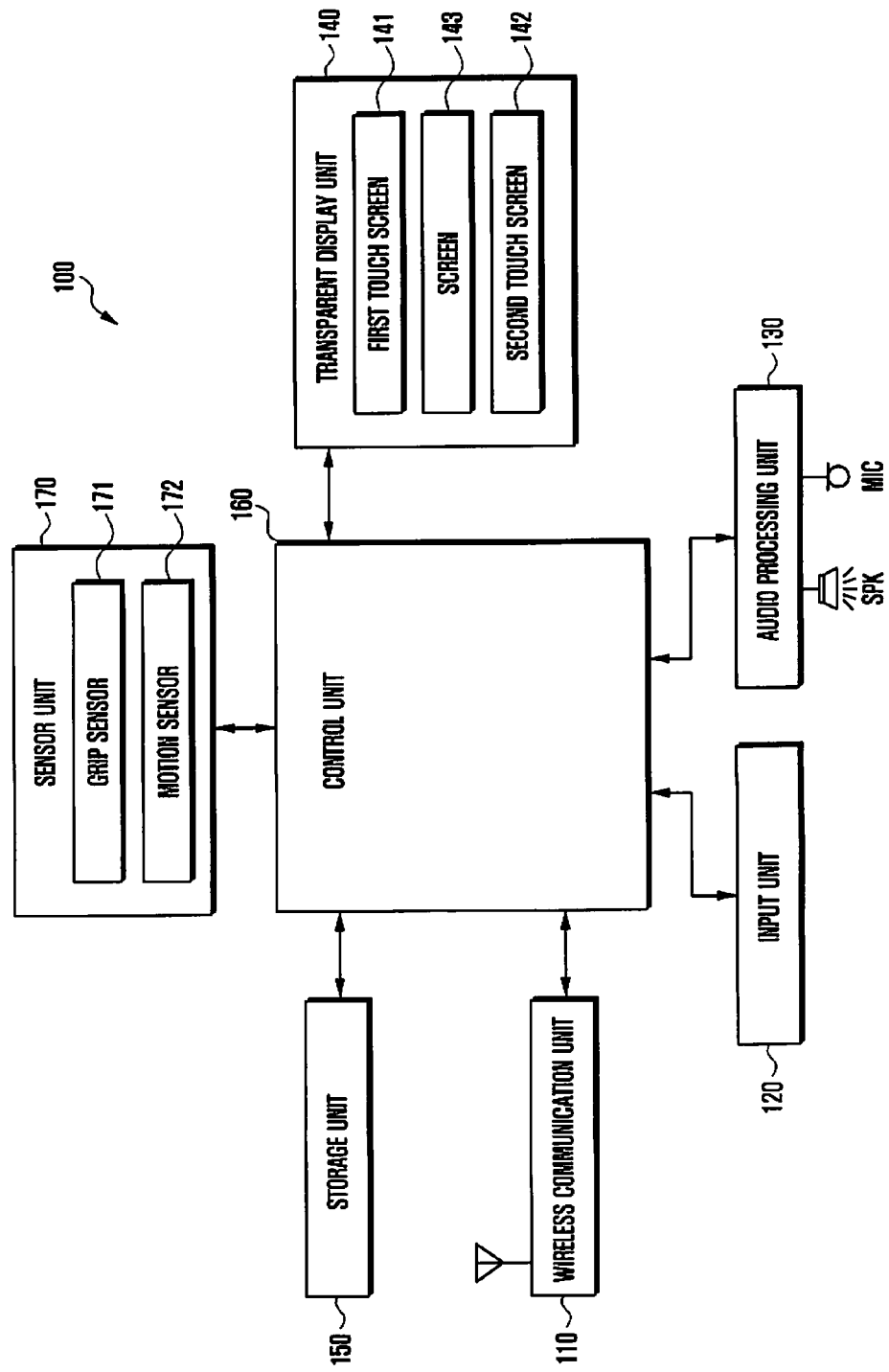
FIG. 1 is a block diagram illustrating a configuration of a portable terminal according to an embodiment of the present invention.

Hereinafter, embodiments of the present invention will be described in detail with reference to the accompanying drawings. It should be noted that the same elements will be designated by the same reference numerals although they are shown in different drawings. Further, detailed descriptions related to well-known functions or configurations capable of making subject matters of the present invention unnecessarily obscure will be omitted.

Meanwhile, embodiments of the present invention shown and described in this specification and the drawings correspond to specific examples presented in order to easily explain technical contents of the present invention, and to help comprehension of the present invention, but are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

FIG. 1 is a block diagram illustrating a configuration of a portable terminal according to an embodiment of the present invention. Referring to FIG. 1, the portable terminal 100 according to an embodiment of the present invention includes a wireless communication unit 110, an input unit 120, an audio processing unit 130, a transparent display unit 140, a storage unit 150, a control unit 160, and a sensor unit 170.

Under the control of the control unit 160, the wireless communication unit 110 of the portable terminal 100 including the above-described elements establishes a communication channel for a voice call, a communication channel for a video call, a communication channel for transmitting data such as an image or a message, a communication channel for connecting to a network, and the like. Specifically, the wireless communication unit 110 establishes a voice call channel, a data communication channel, and a video call channel between mobile communication systems. The wireless communication unit 110 may further include a Radio Frequency (RF) transmission unit for upconverting the frequency of a signal to be transmitted and then amplifying the frequency-upconverted signal, and an RF reception unit for low-noise amplifying a received signal and then downconverting the frequency of the low-noise amplified signal, and the like.

The input unit 120 includes multiple input keys and function keys for receiving number and character information as input, and setting various functions. The function keys include arrow keys, side keys, hot keys, and the like, which are set to perform particular functions. The input unit 120 also generates a key signal related to a user setting and the function control of the portable terminal 100, and delivers the generated key signal to the control unit 160. The input unit 120 may be implemented by a QWERTY keypad, a 3*4 keypad, a 4*3 keypad, and the like, each of which includes multiple keys. Alternatively, the input unit 120 may be implemented by a QWERTY key map, a 3*4 key map, a 4*3 key map, a menu map, a control key map, and the like, each of which is displayed on the transparent display unit 140. When the transparent display unit 140 of the portable terminal 100 is supported in the form of a full touch screen, the input unit 120 may include only a side key formed on a side of a case of the portable terminal 100.

The audio processing unit 130 includes a speaker (SPK) for outputting audio data transmitted and received during a telephone call, audio data included in a received message, audio data obtained by reproducing an audio file stored in the storage unit 150, and the like, and a microphone (MIC) for collecting a voice of a user during a telephone call or other audio signals. The audio processing unit 130 may generate a corresponding effect sound when a first touch screen unit 141 or a second touch screen unit 142 as described below is set to lock or unlock. An effect sound may be omitted or replaced with a pre-stored effect sound according to a user setting.

The transparent display unit 140 includes the first touch screen unit 141 and the second touch screen unit 142, each of which recognizes a touch of the user as a command and generates a signal matched to the recognized touch of the user; and a screen unit 143 which is arranged between the first touch screen unit 141 and the second touch screen unit 142, displays a screen image, and adjusts a transparency and displays a screen according to the adjusted transparency. The transparent display unit 140 also has characteristics of a double-sided display. Specifically, the transparent display unit 140 has characteristics such that a screen is visible from both the front and back sides thereof, and an input is capable of being performed on both sides thereof.

The screen unit 143 displays a screen image, and may display a transparency of a screen by using a value selected from among consecutive values between a value representing transparentness and a value representing opacity under the control of the control unit 160. A lock/unlock area is disposed in a UI form at one side of the transparent display. The lock/unlock area is provided in the shape of a triangle, a rectangle, a circle, and the like, and is configured so as not to be affected by an unnecessary touch of the user.

For convenience of description, when the user grips the portable terminal having the transparent display is described, a front part of the portable terminal which faces the user is referred to as the "first touch screen unit 141", and the rear part thereof which contacts the palm of the user is referred to as the "second touch screen unit 142." However, the first touch screen unit 141 and the second touch screen unit 142 may be switched to perform functions of each other, and have no difference in performing a function of a process matched to a touch.

The sensor unit 170 which senses a force applied to the portable terminal 100 includes a grip sensor 171 which is mounted on a lateral surface of the portable terminal 100 and senses whether the user grips the portable terminal 100, and a motion sensor 172 which is mounted inside the portable terminal 100 and senses an operation of the portable terminal 100. The grip sensor 171 may be implemented by using a piezoelectric sensor, and the motion sensor 172 may be an acceleration sensor, a gyro sensor, or a sensor configured by combining the acceleration sensor and the gyro sensor.

The grip sensor 171 senses whether the user has gripped the portable terminal 100, and generates a grip signal when the user has gripped the portable terminal 100. When sensing that a touch signal is received as an input from any one of the first touch screen unit 141 or the second touch screen unit 142 when a grip signal is received as an input from the grip sensor 171, the control unit 160 determines that an unnecessary touch is input to the first touch screen unit 141 or the second touch screen unit 142 when the user grips the portable terminal 100. Based on the determination, the control unit 160 may set, to a lock state, one of the first touch screen unit 141 and the second touch screen unit 142 which has received the relevant touch signal as the input.

The motion sensor 172 senses the motion of the portable terminal 100. The control unit 160 determines which type of signal is a motion signal sensed by the motion sensor 172. When the sensed motion signal is a movement signal caused by rotating the portable terminal such that each of the first touch screen unit 141 and the second touch screen unit 142 is in a reverse direction, the control unit 160 reverses the lock/unlock states of the first touch screen unit 141 and the second touch screen unit 142, each of which is set to a lock state or an unlock state.

The storage unit 150 stores an application program required to perform functions according to an embodiment of the present invention, a key map or a menu map for operating the transparent display unit 140, and the like. The storage unit 150 also stores a UI which enables selective lock or unlock of the touch screen units, and the like.

The storage unit 150 may broadly include a program area and a data area. The program area stores an Operating System (OS) for booting the portable terminal 100 and operating each of the above-described elements, application programs for reproducing various files, and the like. Examples of the application programs includes an application for supporting a telephone call function of the portable terminal 100, a web browser for connecting to an Internet server, a Moving Picture Experts Group (MPEG) Audio Layer-3 (MP3) application program for reproducing a sound source, an image output application program for reproducing a photograph, and the like, and an application program for reproducing a moving image. Particularly, the program area according to an embodiment of the present invention stores a control program and a UI capable of controlling the lock and unlock of the transparent display unit 140 and controlling a corresponding transparency according to the lock and unlock of the transparent display unit 140.

The control unit 160 performs a control operation for displaying a corresponding transparency, according to a screen setting state which has been set by the user or according to the detection of lock/unlock states matched to a default setting. For example, the control unit 160 performs a control operation for displaying transparencies matched to a case in which the first touch screen unit 141 and the second touch screen unit 142 are both set to lock, a case in which the first touch screen unit 141 and the second touch screen unit 142 are both set to unlock, a case in which the first touch screen unit 141 is set to unlock and the second touch screen unit 142 is set to lock, and a case in which the first touch screen unit 141 is set to lock and the second touch screen unit 142 is set to unlock. For example, in the case of a lock state, the control unit 160 performs a control operation for displaying a transparency so as to be close to opacity, whereas in the case of an unlock state, the control unit 160 performs a control operation for displaying a transparency so as to be close to being completely transparent.

The control unit 160 performs a control operation for locking/unlocking the first touch screen unit 141 and the second touch screen unit 142 so as to be matched to lock/unlock inputs which are input to lock/unlock areas through the first touch screen unit 141 and the second touch screen unit 142 according to lock/unlock screen setting states. According to a setting, the control unit 160 may control the lock/unlock of at least one of the first touch screen unit 141 and the second touch screen unit 142 by using a touch which has been input through the first touch screen unit 141. Similarly, the control unit 160 may control the lock/unlock of at least one of the first touch screen unit 141 and the second touch screen unit 142 by using a touch which has been input through the second touch screen unit 142.

When sensing a grip signal through the grip sensor 171 and sensing, for example, a touch through the second touch screen unit 142, the control unit 160 sets the second touch screen unit 142 to lock. Further, the control unit 160 controls the lock/unlock of the first touch screen unit 141 and the second touch screen unit 142, and thereby can increase the convenience of the user.

Figure 2:
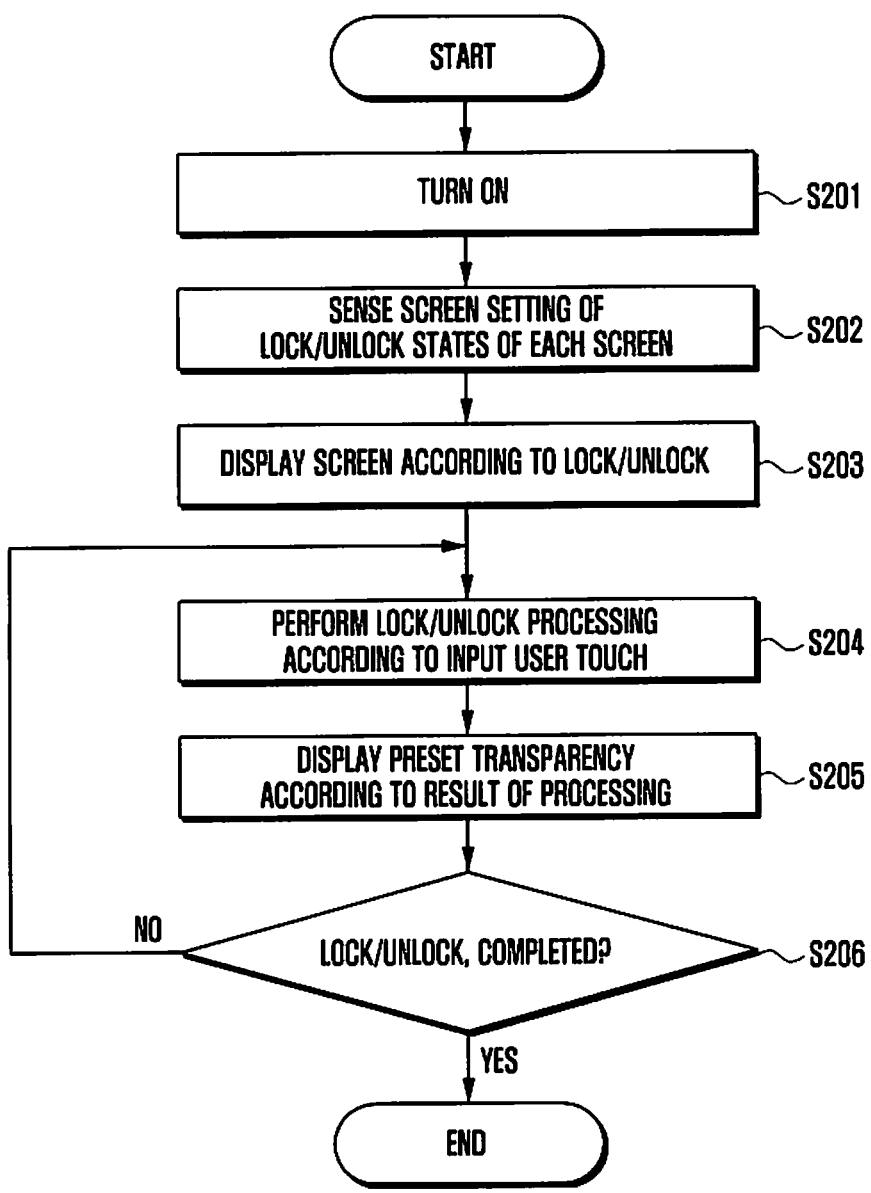
FIG. 2 is a flowchart illustrating a method for locking or unlocking a display in a portable terminal according to an embodiment of the present invention.

FIG. 2 is a flowchart illustrating a method for locking or unlocking a display in a portable terminal according to an embodiment of the present invention. Referring to FIG. 2, the user turns power on or activates the portable terminal 100 in a standby state through the input unit 120 in step S201. The control unit 160 senses a screen setting of lock/unlock states of each screen, in step S202. For example, according to a setting, the first touch screen unit 141 and the second touch screen unit 142 may be both set to lock, or the first touch screen unit 141 and the second touch screen unit 142 may be both set to unlock. Alternatively, the first touch screen unit 141 may be set to unlock and the second touch screen unit 142 may be set to lock. Alternatively, the first touch screen unit 141 may be set to lock and the second touch screen unit 142 may be set to unlock.

In step S203, the control unit 160 controls the transparent display unit 140 to display a screen according to the sensed lock/unlock state of each screen. Meanwhile, the transparent display unit 140 displays a UI area capable of controlling lock or unlock (hereinafter referred to as a "lock/unlock area") at one side thereof. Here, the lock/unlock area may be provided in an active state regardless of lock/unlock states, and may lock or unlock the transparent display unit 140 according to a touch input by the user.

Examples of display of a screen according to lock/unlock state of each screen are as follows. As a first example, the first touch screen unit 141 and the second touch screen unit 142 are both in a lock state. In the first example, a transparency of the transparent display unit 140 is reduced, and thereby the user is capable of visually recognizing that the first touch screen unit 141 and the second touch screen unit 142 are both in a lock state. As a second example, the first touch screen unit 141 is in a lock state, and the second touch screen unit 142 is in an unlock state. As a third example, the first touch screen unit 141 is in an unlock state, and the second touch screen unit 142 is in a lock state. In the second and third examples, the transparency of the transparent display unit 140 is represented as a preset transparency, and thereby the user is capable of easily knowing which screen is in a lock state and which screen is in an unlock state. As a fourth example, the first touch screen unit 141 and the second touch screen unit 142 are both in an unlock state. Hereinafter, the transparency of the transparent display unit 140 is displayed in such a manner as to be only affected by the second touch screen unit 142. That is, regardless of the lock or unlock of the first touch screen unit 141, when the second touch screen unit 142 is in a lock state, the transparency of the transparent display unit 140 is displayed on the transparent display unit 140 so as to be close to opacity; when the second touch screen unit 142 is in an unlock state, the transparency of the transparent display unit 140 is displayed on the transparent display unit 140 so as to be close to being completely transparent.

In step S204, according to the lock/unlock state of each of the first touch screen unit 141 and the second touch screen unit 142, the control unit 160 performs lock/unlock processing according to a user touch which has been input to a lock/unlock area through each of the first touch screen unit 141 and the second touch screen unit 142. The lock/unlock processing will be described in detail below with reference to FIG. 3 to FIG. 6.

In step S205, the control unit 160 displays the transparency of the screen of the transparent display unit 140 by using the preset transparency, according to a result of performing the lock/unlock processing in step S204.

In step S206, the control unit 160 determines whether lock/unlock control is completed. When it is determined in step S206 that the lock/unlock control is completed, the control unit 160 terminates the lock/unlock control. For example, the termination of the lock/unlock control may correspond to a power-off state of the portable terminal 100 or a standby state of the portable terminal 100.

When it is determined in step S206 that the lock/unlock control is not completed, the control unit 160 proceeds to step S204, and enables lock/unlock processing according to an input by the user to be performed.

Figure 3:
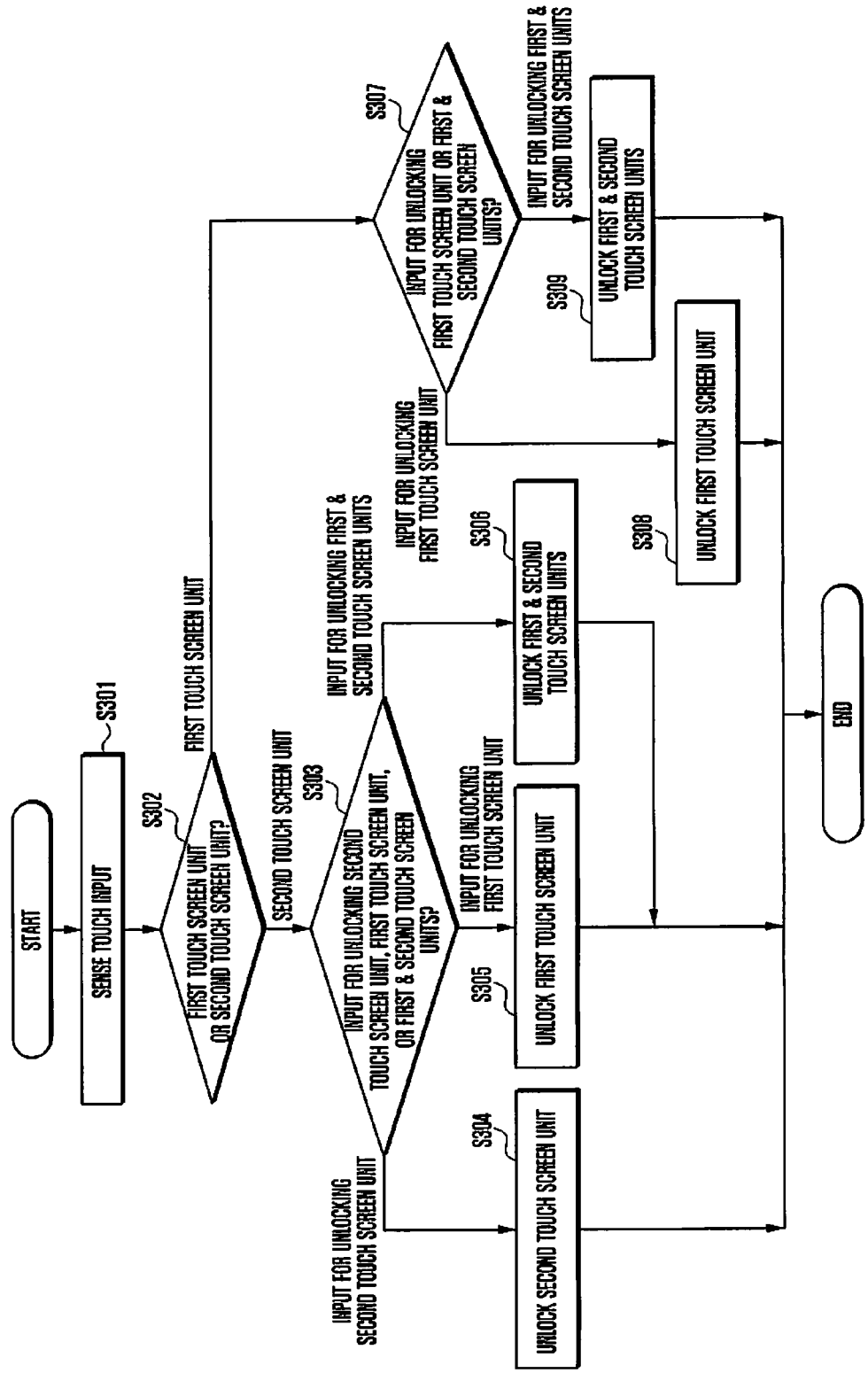
FIG. 3 is a flowchart illustrating a process for performing lock/unlock processing according to a user input in lock/unlock states illustrated in FIG. 2, according to a first embodiment of the present invention.

FIG. 3 is a flowchart illustrating a process for performing lock/unlock processing according to a user input in lock/unlock states illustrated in FIG. 2, according to a first embodiment of the present invention. With reference to FIG. 3, a case in which the first touch screen unit 141 and the second touch screen unit 142 are both in a lock state is described. In step S301, when the user inputs a touch to a lock/unlock area, the control unit 160 senses the touch input. In step S302, the control unit 160 determines whether the user has input the touch through the first touch screen unit 141 or the second touch screen unit 142.

When it is determined in step S302 that the user has input the touch to a lock/unlock area through the second touch screen unit 142, in step S303, the control unit 160 determines whether the touch input from the second touch screen unit 142 is an input for unlocking the second touch screen unit 142, is an input for unlocking the first touch screen unit 141, or is an input for unlocking the first touch screen unit 141 and the second touch screen unit 142 simultaneously.

When it is determined in step S303 that the touch input from the second touch screen unit 142 is an input for unlocking the second touch screen unit 142, in step S304, the control unit 160 unlocks the second touch screen unit 142. The control unit 160 then proceeds to step S205 illustrated in FIG. 2, and displays a transparency according to a case in which the second touch screen unit 142 is in the unlock state regardless of the lock or unlock state of the first touch screen unit 141, on the transparent display unit 140.

When it is determined in step S303 that the touch input from the second touch screen unit 142 is an input for unlocking the first touch screen unit 141, in step S305, the control unit 160 unlocks the first touch screen unit 141. The control unit 160 then proceeds to step S205 illustrated in FIG. 2, and displays a transparency according to a case in which the second touch screen unit 142 is in the lock state regardless of the lock or unlock state of the first touch screen unit 141, on the transparent display unit 140.

When it is determined in step S303 that the touch input from the second touch screen unit 142 is an input for unlocking the first touch screen unit 141 and the second touch screen unit 142, in step S306, the control unit 160 unlocks the first touch screen unit 141 and the second touch screen unit 142. The control unit 160 then proceeds to step S205 illustrated in FIG. 2, and displays the transparency according to the case in which the second touch screen unit 142 is in the unlock state regardless of the lock or unlock state of the first touch screen unit 141, on the transparent display unit 140.

When it is determined in step S302 that the user has input the touch to a lock/unlock area through the first touch screen unit 141, in step S307, the control unit 160 determines whether the touch input from the first touch screen unit 141 is an input for unlocking the first touch screen unit 141 or an input for unlocking the first touch screen unit 141 and the second touch screen unit 142 simultaneously.

When it is determined in step S307 that the touch input from the first touch screen unit 141 is an input for unlocking the first touch screen unit 141, in step S308, the control unit 160 unlocks the first touch screen unit 141. The control unit 160 then proceeds to step S205 illustrated in FIG. 2, and displays the transparency according to the case in which the second touch screen unit 142 is in the lock state regardless of the lock or unlock state of the first touch screen unit 141, on the transparent display unit 140.

When it is determined in step S307 that the touch input from the first touch screen unit 141 is an input for unlocking the first touch screen unit 141 and the second touch screen unit 142 simultaneously, in step S309, the control unit 160 unlocks the first touch screen unit 141 and the second touch screen unit 142 simultaneously. The control unit 160 then proceeds to step S205 illustrated in FIG. 2, and displays the transparency according to the case in which the second touch screen unit 142 is in the unlock state regardless of the lock or unlock state of the first touch screen unit 141, on the transparent display unit 140.

Figure 4:
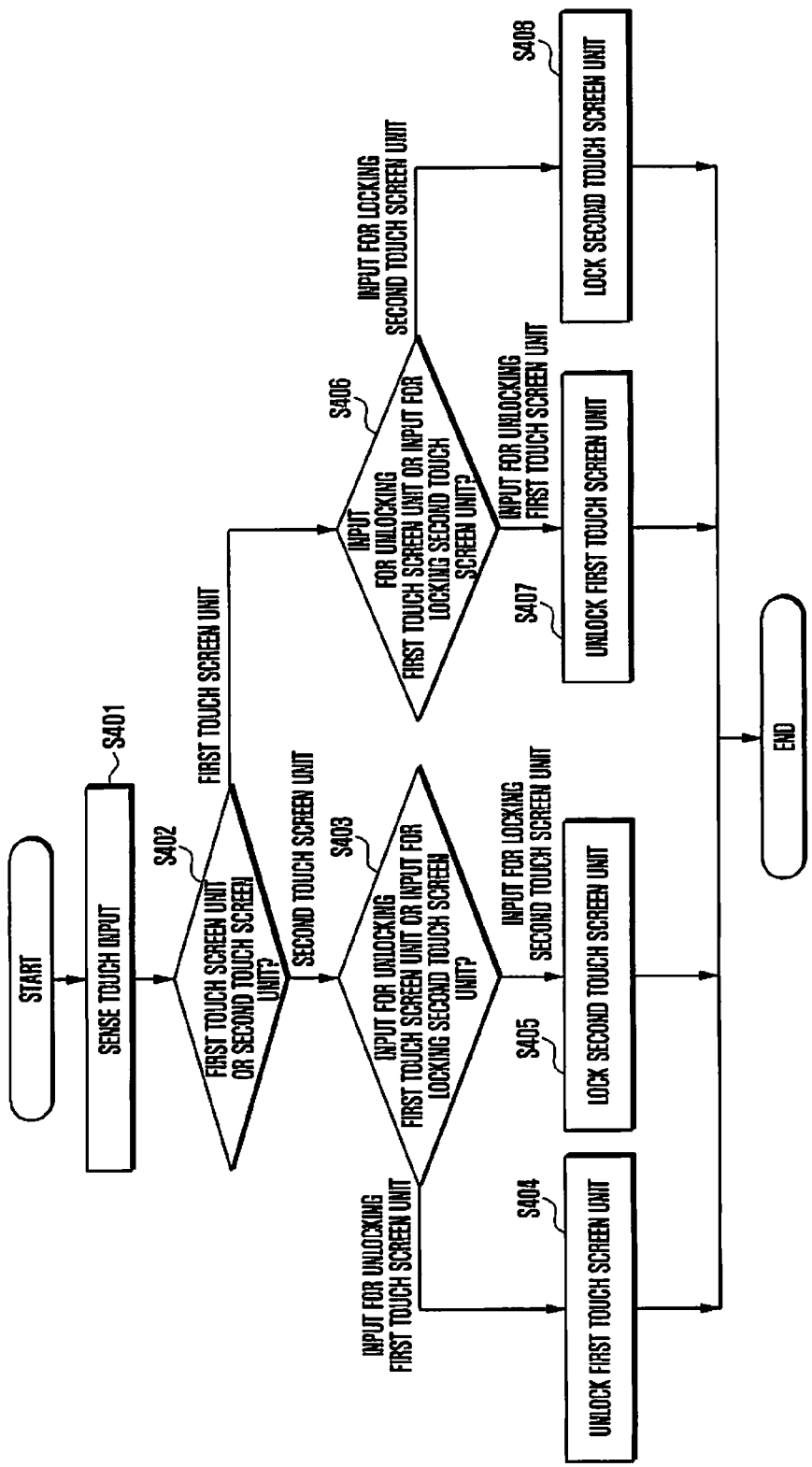
FIG. 4 is a flowchart illustrating a process for performing lock/unlock processing according to a user input in lock/unlock states illustrated in FIG. 2, according to a second embodiment of the present invention.

FIG. 4 is a flowchart illustrating a process for performing lock/unlock processing according to a user input in lock/unlock states illustrated in FIG. 2, according to a second embodiment of the present invention. With reference to FIG. 4, a case in which the first touch screen unit 141 is in a lock state and the second touch screen unit 142 is in an unlock state is described. In step S401, when the user inputs a touch to a lock/unlock area, the control unit 160 senses the touch input. In step S402, the control unit 160 determines whether the user has input the touch through the first touch screen unit 141 or the second touch screen unit 142.

When it is determined in step S402 that the user has input the touch to a lock/unlock area through the second touch screen unit 142, in step S403, the control unit 160 determines whether the touch input from the second touch screen unit 142 is an input for unlocking the first touch screen unit 141 or is an input for locking the second touch screen unit 142.

When it is determined in step S403 that the touch input from the second touch screen unit 142 is an input for unlocking the first touch screen unit 141, in step S404, the control unit 160 unlocks the first touch screen unit 141. The control unit 160 then proceeds to step S205 illustrated in FIG. 2, and displays a transparency according to a case in which the second touch screen unit 142 is in an unlock state regardless of the lock or unlock state of the first touch screen unit 141, on the transparent display unit 140.

When it is determined in step S403 that the touch input from the second touch screen unit 142 is an input for locking the second touch screen unit 142, in step S405, the control unit 160 locks the second touch screen unit 142. The control unit 160 then proceeds to step S205 illustrated in FIG. 2, and displays a transparency according to a case in which the second touch screen unit 142 is in a lock state regardless of the lock or unlock state of the first touch screen unit 141, on the transparent display unit 140.

When it is determined in step S402 that the user has input the touch to a lock/unlock area through the first touch screen unit 141, in step S406, the control unit 160 determines whether the touch input from the first touch screen unit 141 is an input for unlocking the first touch screen unit 141 or is an input for locking the second touch screen unit 142.

When it is determined in step S406 that the touch input from the first touch screen unit 141 is an input for unlocking the first touch screen unit 141, in step S407, the control unit 160 unlocks the first touch screen unit 141. The control unit 160 then proceeds to step S205 illustrated in FIG. 2, and displays the transparency according to the case in which the second touch screen unit 142 is in the unlock state regardless of the lock or unlock state of the first touch screen unit 141, on the transparent display unit 140.

When it is determined in step S406 that the touch input from the first touch screen unit 141 is an input for locking the second touch screen unit 142, in step S408, the control unit 160 locks the second touch screen unit 142. The control unit 160 then proceeds to step S205 illustrated in FIG. 2, and displays the transparency according to the case in which the second touch screen unit 142 is in the lock state regardless of the lock or unlock state of the first touch screen unit 141, on the transparent display unit 140.

Figure 5:
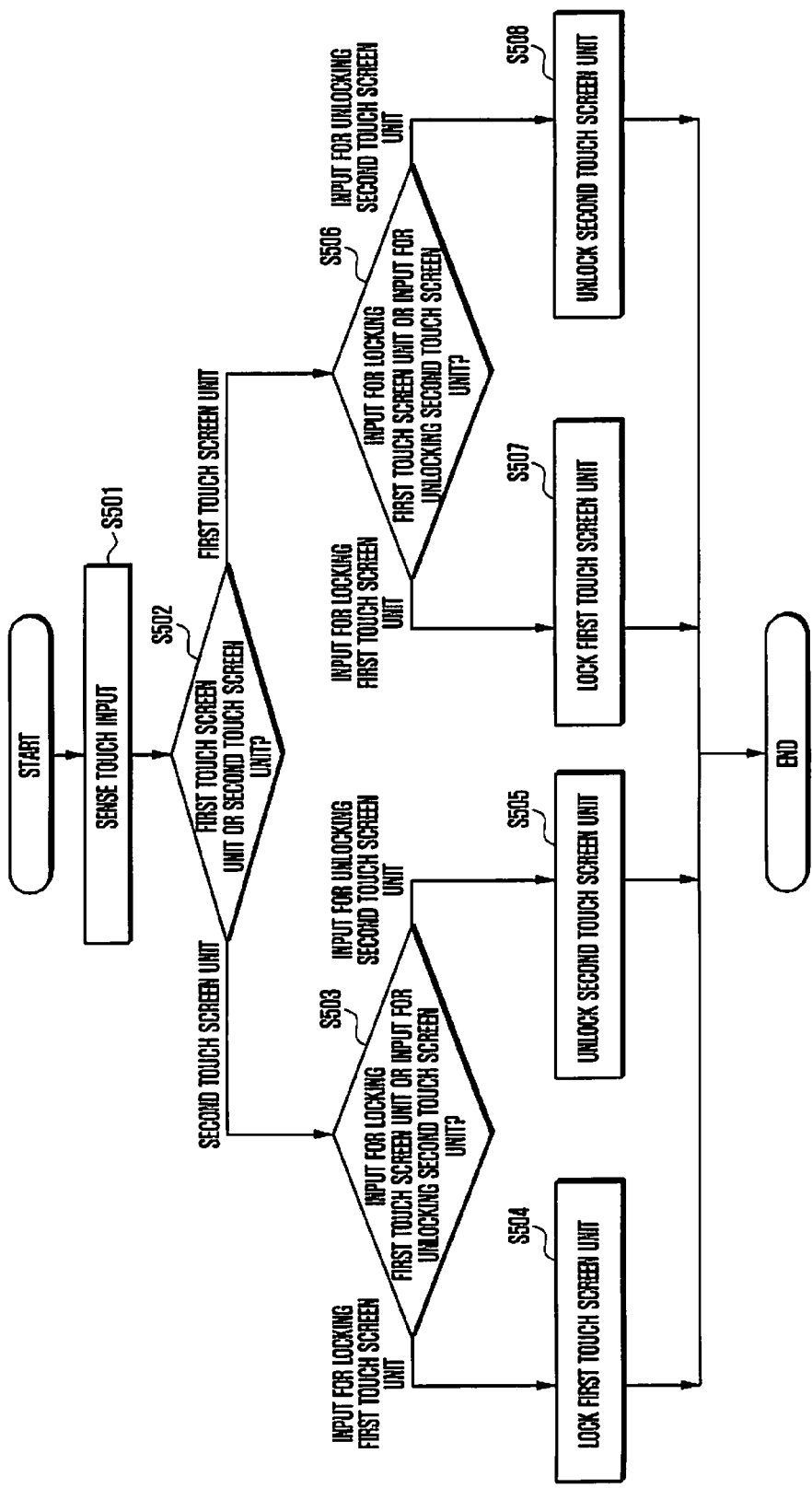
FIG. 5 is a flowchart illustrating a process for performing lock/unlock processing according to a user input in lock/unlock states illustrated in FIG. 2, according to a third embodiment of the present invention.

FIG. 5 is a flowchart illustrating a process for performing lock/unlock processing according to a user input in lock/unlock states illustrated in FIG. 2, according to a third embodiment of the present invention. With reference to FIG. 5, a case in which the first touch screen unit 141 is in an unlock state and the second touch screen unit 142 is in a lock state is described. In step S501, when the user inputs a touch to a lock/unlock area, the control unit 160 senses the touch input. In step S502, the control unit 160 determines whether the user has input the touch through the first touch screen unit 141 or the second touch screen unit 142.

When it is determined in step S502 that the user has input the touch to a lock/unlock area through the second touch screen unit 142, in step S503, the control unit 160 determines whether the touch input from the second touch screen unit 142 is an input for locking the first touch screen unit 141 or is an input for unlocking the second touch screen unit 142.

When it is determined in step S503 that the touch input from the second touch screen unit 142 is an input for locking the first touch screen unit 141, in step S504, the control unit 160 locks the first touch screen unit 141. The control unit 160 then proceeds to step S205 illustrated in FIG. 2, and displays a transparency according to a case in which the second touch screen unit 142 is in a lock state regardless of the lock or unlock state of the first touch screen unit 141, on the transparent display unit 140.

When it is determined in step S503 that the touch input from the second touch screen unit 142 is an input for unlocking the second touch screen unit 142, in step S505, the control unit 160 unlocks the second touch screen unit 142. The control unit 160 then proceeds to step S205 illustrated in FIG. 2, and displays a transparency according to a case in which the second touch screen unit 142 is in an unlock state regardless of the lock or unlock state of the first touch screen unit 141, on the transparent display unit 140.

When it is determined in step S502 that the user has input the touch to a lock/unlock area through the first touch screen unit 141, in step S506, the control unit 160 determines whether the touch input from the first touch screen unit 141 is an input for locking the first touch screen unit 141 or is an input for unlocking the second touch screen unit 142.

When it is determined in step S506 that the touch input from the first touch screen unit 141 is an input for locking the first touch screen unit 141, in step S507, the control unit 160 locks the first touch screen unit 141. The control unit 160 proceeds to step S205 illustrated in FIG. 2, and displays the transparency according to the case in which the second touch screen unit 142 is in the lock state regardless of the lock or unlock state of the first touch screen unit 141, on the transparent display unit 140.

When it is determined in step S506 that the touch input from the first touch screen unit 141 is an input for unlocking the second touch screen unit 142, in step S508, the control unit 160 unlocks the second touch screen unit 142. The control unit 160 then proceeds to step S205 illustrated in FIG. 2, and displays the transparency according to the case in which the second touch screen unit 142 is in the unlock state regardless of the lock or unlock state of the first touch screen unit 141, on the transparent display unit 140.

FIG. 6 is a flowchart illustrating a process for performing lock/unlock processing according to a user input in lock/unlock states illustrated in FIG. 2, according to a fourth embodiment of the present invention. With reference to FIG. 6, a case in which the first touch screen unit 141 and the second touch screen unit 142 are both in an unlock state is described. In step S601, when the user inputs a touch to a lock/unlock area, the control unit 160 senses the touch input. In step S602, the control unit 160 determines whether the user has input the touch through the first touch screen unit 141 or the second touch screen unit 142.

When it is determined in step S602 that the user has input the touch to a lock/unlock area through the second touch screen unit 142, in step S603, the control unit 160 determines whether the touch input from the second touch screen unit 142 is an input for locking the second touch screen unit 142 or is an input for locking the first touch screen unit 141 and the second touch screen unit 142 simultaneously.

When it is determined in step S603 that the touch input from the second touch screen unit 142 is an input for locking the second touch screen unit 142, in step S604, the control unit 160 locks the second touch screen unit 142. The control unit 160 then proceeds to step S205 illustrated in FIG. 2, and displays a transparency according to a case in which the second touch screen unit 142 is in a lock state regardless of the lock or unlock state of the first touch screen unit 141, on the transparent display unit 140.

When it is determined in step S603 that the touch input from the second touch screen unit 142 is an input for locking the first touch screen unit 141 and the second touch screen unit 142, in step S605, the control unit 160 simultaneously locks the first touch screen unit 141 and the second touch screen unit 142. The control unit 160 then proceeds to step S205 illustrated in FIG. 2, and displays the transparency according to the case in which the second touch screen unit 142 is in the lock state regardless of the lock or unlock state of the first touch screen unit 141, on the transparent display unit 140.

When it is determined in step S602 that the user has input the touch to a lock/unlock area through the first touch screen unit 141, in step S606, the control unit 160 determines whether the touch input from the first touch screen unit 141 is an input for locking the first touch screen unit 141, is an input for locking the second touch screen unit 142, or is an input for simultaneously locking the first touch screen unit 141 and the second touch screen unit 142.

When it is determined in step S606 that the touch input from the first touch screen unit 141 is an input for locking the first touch screen unit 141, in step S607, the control unit 160 locks the first touch screen unit 141. The control unit 160 then proceeds to step S205 illustrated in FIG. 2, and displays a transparency according to a case in which the second touch screen unit 142 is in the unlock state regardless of the lock or unlock state of the first touch screen unit 141, on the transparent display unit 140.

When it is determined in step S606 that the touch input from the first touch screen unit 141 is an input for locking the second touch screen unit 142, in step S608, the control unit 160 locks the second touch screen unit 142. The control unit 160 then proceeds to step S205 illustrated in FIG. 2, and displays the transparency according to the case in which the second touch screen unit 142 is in the lock state regardless of the lock or unlock state of the first touch screen unit 141, on the transparent display unit 140.

When it is determined in step S606 that the touch input from the first touch screen unit 141 is an input for locking the first touch screen unit 141 and the second touch screen unit 142 simultaneously, in step S609, the control unit 160 locks the first touch screen unit 141 and the second touch screen unit 142 simultaneously. The control unit 160 then proceeds to step S205 illustrated in FIG. 2, and displays the transparency according to the case in which the second touch screen unit 142 is in the lock state regardless of the lock or unlock state of the first touch screen unit 141, on the transparent display unit 140.

Hereinafter, for convenience of description, a touch screen on the front surface of the transparent display unit 140 is designated as the first touch screen unit 141, and a touch screen on the rear surface of the transparent display unit 140 is designated as the second touch screen unit 142.

Figure 7A:
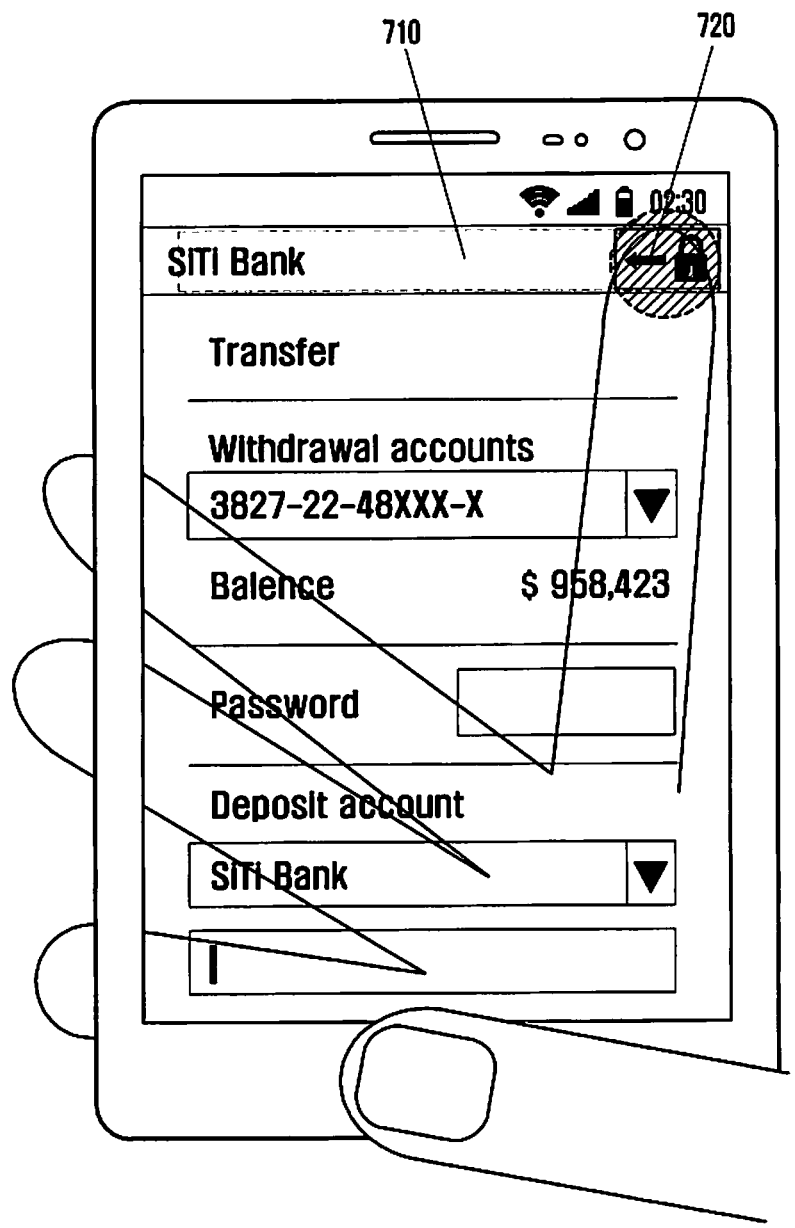
FIGS. 7A and 7B are views illustrating an example of locking or unlocking a display of a portable terminal according to an embodiment of the present invention.
Figure 7B:
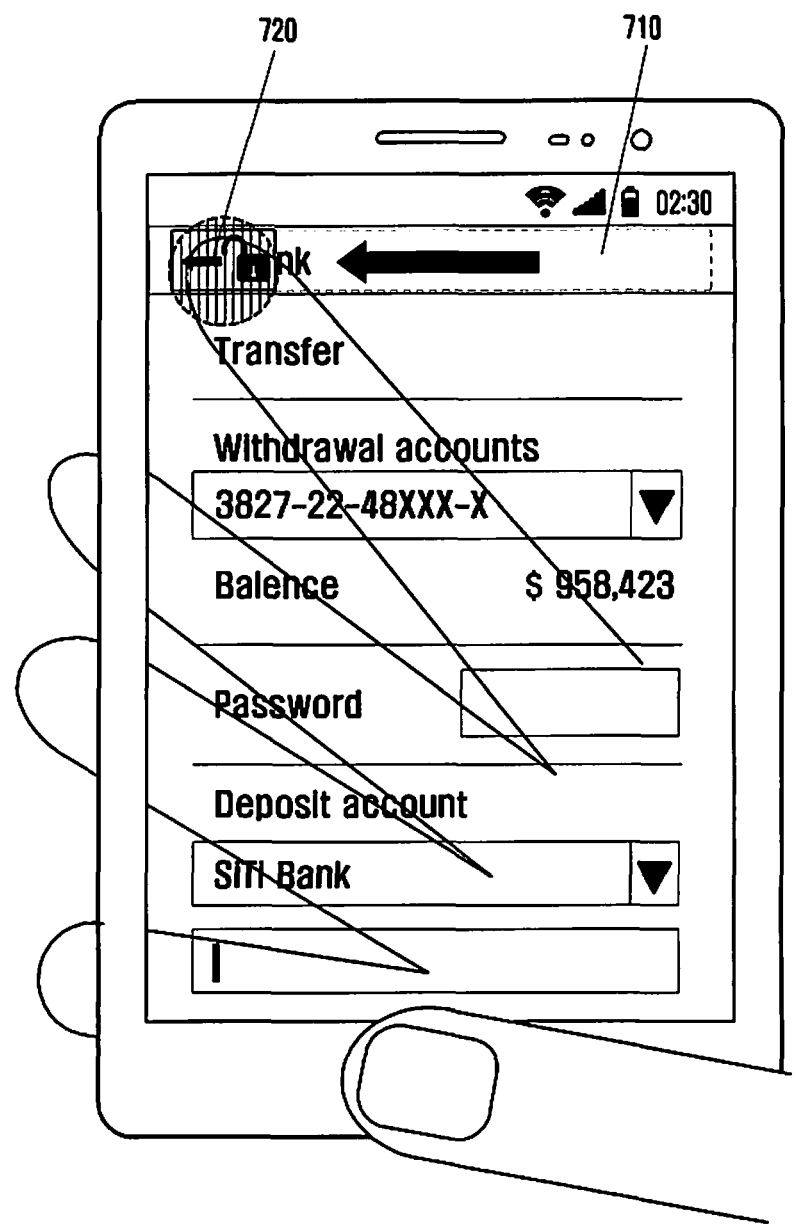

FIGS. 7A and 7B are views illustrating an example of locking or unlocking a display of a portable terminal according to an embodiment of the present invention. Referring to FIGS. 7A and 7B, a touch input may be controlled by moving, from side to side, an indicator 720 within a lock/unlock area 710 disposed at an upper part of the transparent display unit 140.

Referring to FIG. 7A, the lock/unlock area 710 is displayed at one side of an upper part of the transparent display unit 140. The indicator 720, in which a lock-shaped icon indicating a lock state is displayed, is displayed at a right end part of the lock/unlock area 710. As illustrated in FIG. 7A, the second touch screen unit 142 is in a lock state, and the lock/unlock area 710 is displayed on the second touch screen unit 142. The user keeps a finger of the user in contact with the lock/unlock area 710 on the second touch screen unit 142.

Referring to FIG. 7B, the user, who keeps the index finger of the user in contact with the indicator 720, located on the right in the lock/unlock area 710, as illustrated in FIG. 7A, drags the indicator 720 to the left through the second touch screen unit 142. In FIG. 7B, after the indicator 720 is moved to the left, within the indicator 720, a lock-shaped icon in a lock state is changed to an unlock-shaped icon in an unlock state. When the lock-shaped icon is changed to unlock-shaped icon in the indicator 720 on the second touch screen unit 142 as illustrated in FIGS. 7A and 7B, the second touch screen unit 142 is changed from a lock state to an unlock state. Here, it has been described that the second touch screen unit 142 is changed from a lock state to an unlock state through the second touch screen unit 142 when the second touch screen unit 142 is in the lock state regardless of the lock or unlock of the first touch screen unit 141. Alternatively, when the first touch screen unit 141 and the second touch screen unit 142 are both in the lock state, the first touch screen unit 141 and the second touch screen unit 142 may be both changed from a lock state to an unlock state through the second touch screen unit 142. Alternatively, when the first touch screen unit 141 is in the unlock state, the first touch screen unit 141 may be changed from an unlock state to a lock state through the second touch screen unit 142. However, for the user to intuitively control the lock/unlock of the touch screen operated by the user, it is more convenient that the first touch screen unit 141 is changed from a lock state to an unlock state through the first touch screen unit 141 and the second touch screen unit 142 is changed from a lock state to an unlock state through the second touch screen unit 142.

Here, an example has been described in which the lock/unlock of the transparent display unit 140 is controlled through the second touch screen unit 142. However, embodiments of the present invention may also be applied to a case in which the lock/unlock of the transparent display unit 140 is controlled through the first touch screen unit 141.

FIGS. 8A to 8D are views illustrating an example of locking or unlocking a display of a portable terminal according to an embodiment of the present invention. FIGS. 8A to 8D illustrate an embodiment in which a lock/unlock area 810 is disposed in a rectangular shape at an upper part of the transparent display unit 140.

Figure 8A:
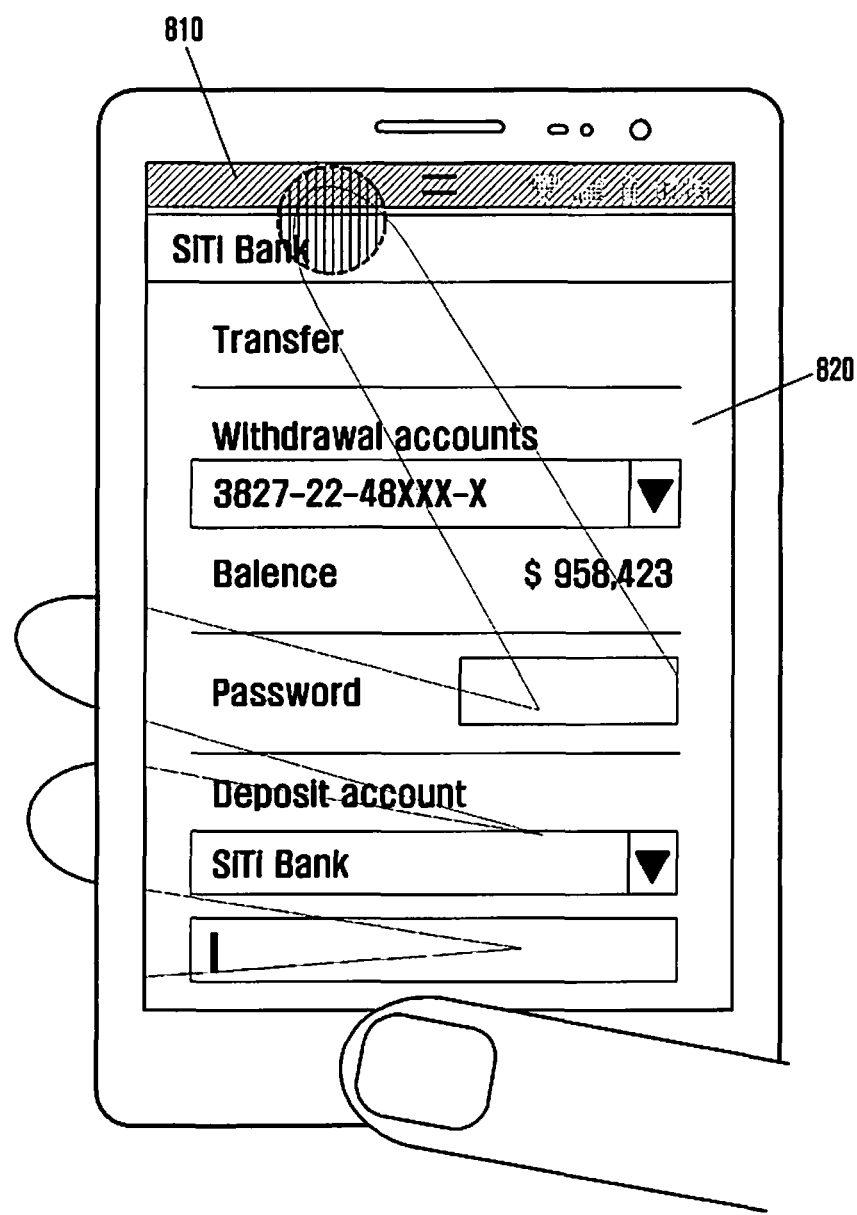
FIGS. 8A to 8D are views illustrating an example of locking or unlocking a display of a portable terminal according to an embodiment of the present invention.

With reference to FIG. 8A, a process will be described for unlocking the second touch screen unit 142 when the second touch screen unit 142 is in a lock state and the index finger of the user drags the lock/unlock area 810 downward while touching the lock/unlock area 810. An execution screen which is currently being executed by the user is displayed in an execution information display area 820 of the transparent display unit 140, and is displayed in a translucent state according to the lock state of the second touch screen unit 142 regardless of the lock or unlock state of the first touch screen unit 141. In FIG. 8A, the index finger of the user touches the lock/unlock area 810 on the second touch screen unit 142.

Figure 8B:
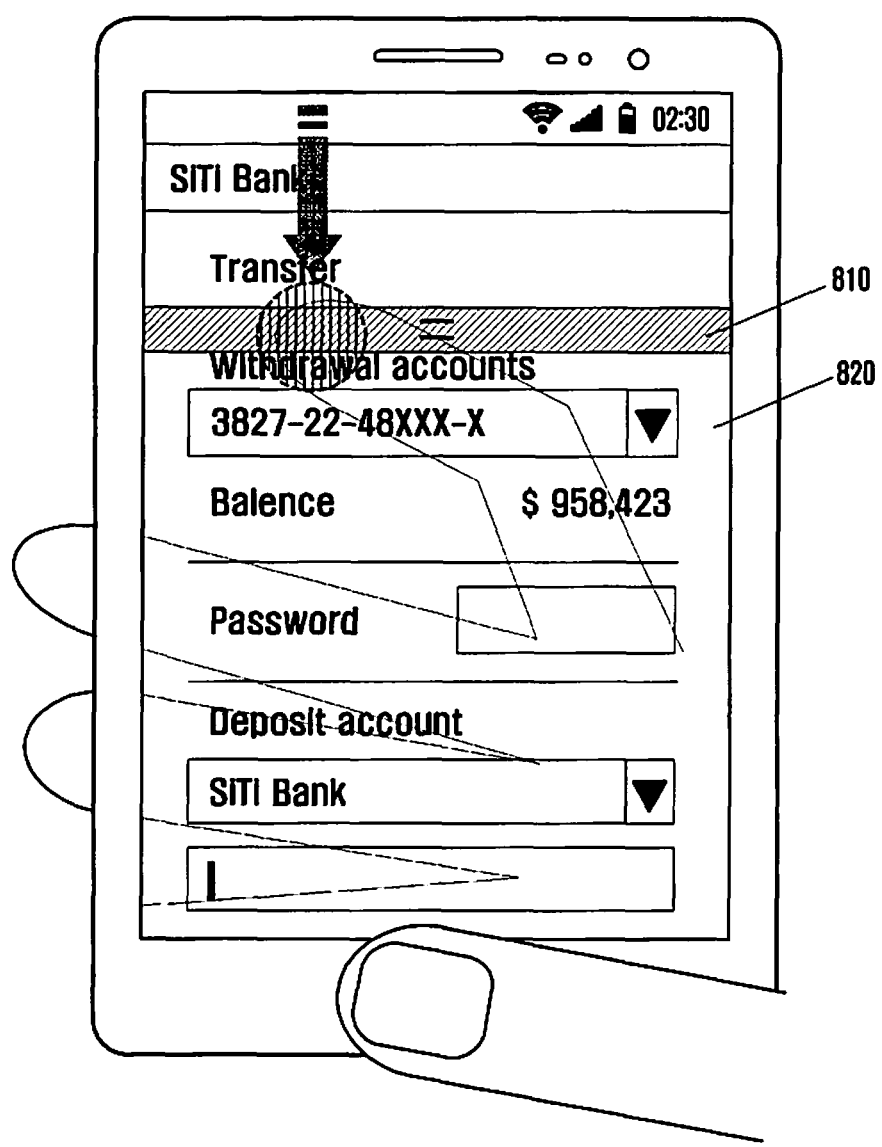

Referring to FIG. 8B, the index finger of the user is dragging the lock/unlock area 810 downward while touching the lock/unlock area 810 on the second touch screen unit 142. Using the lock/unlock area 810 as a reference, the upper execution information display area 820 is displayed in a more transparent state than the lower execution information display area 820.

Figure 8C:
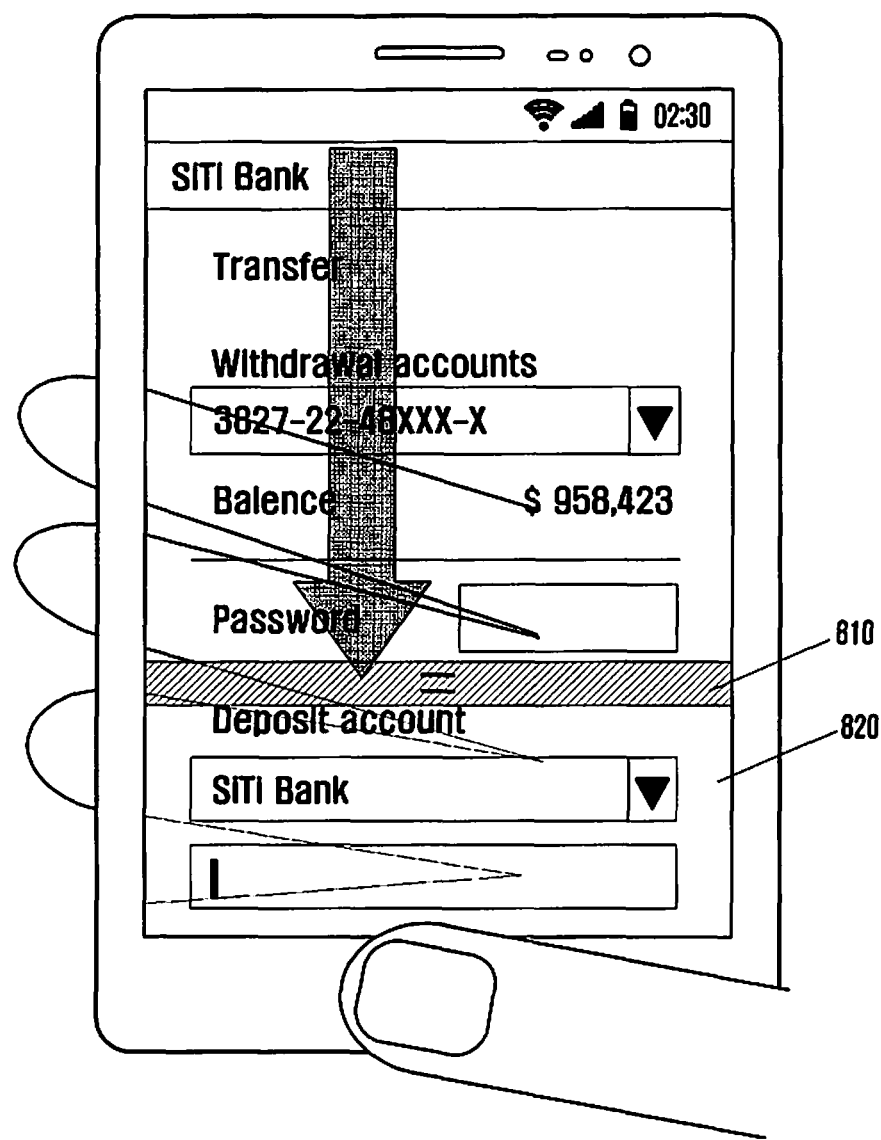

Referring to FIG. 8C, the index finger of the user moves more downward than that of FIG. 8B. The upper execution information display area 820 located at an upper position above the lock/unlock area 810 is displayed in a more transparent state than the lower execution information display area 820 located at a lower position below the lock/unlock area 810, and is clearly distinguishable from the lower execution information display area 820. Specifically, the hand of the user seen through the transparent display unit 140 is more clearly seen in the upper execution information display area 820 than in the lower execution information display area 820.

Figure 8D:
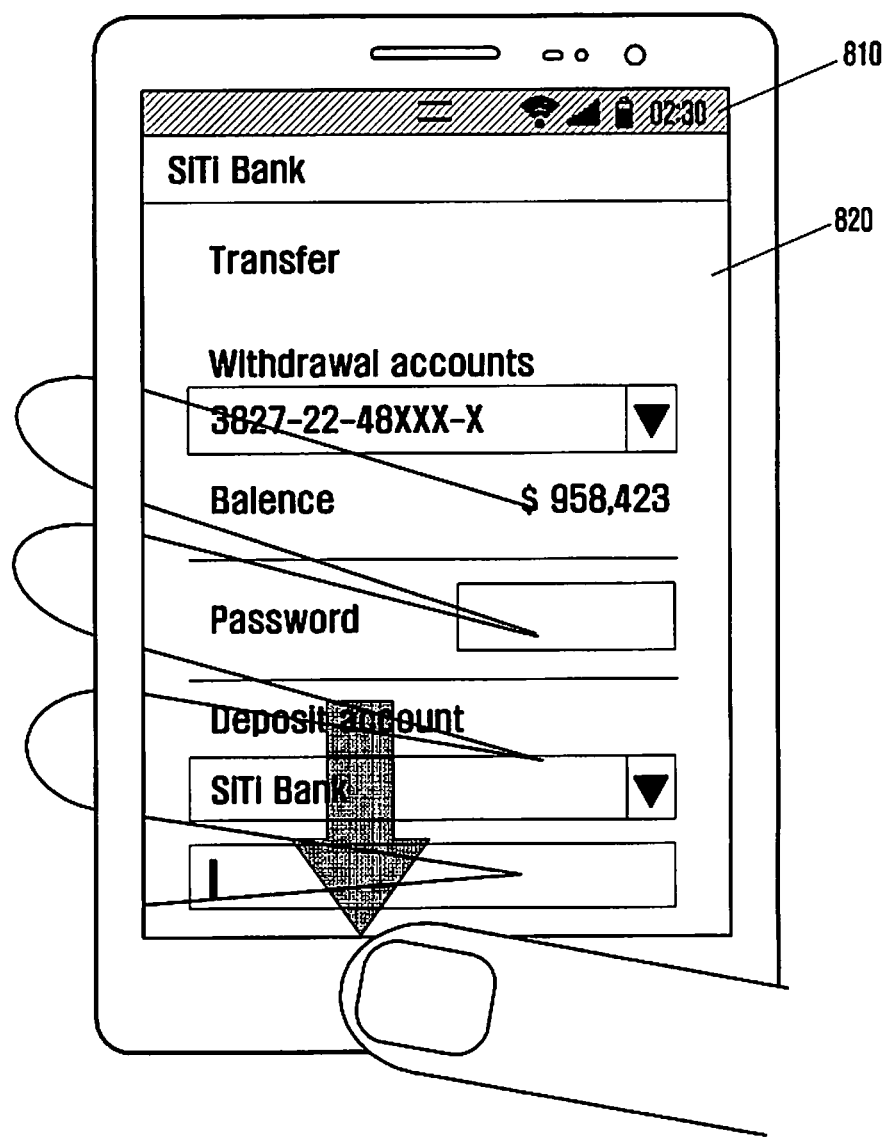

Referring to FIG. 8D, the index finger of the user moves downward to an end lower part of the transparent display unit 140, and the second touch screen unit 142 is changed from a lock state to an unlock state. Also, in order to enable a subsequent change between lock and unlock, the lock/unlock area 810 is displayed similarly to that of FIG. 8A.

FIGS. 9A to 9D are views illustrating an example of locking or unlocking a display of a portable terminal according to an embodiment of the present invention. FIGS. 9A to 9D illustrate an embodiment in which a lock/unlock area is disposed in a rectangular shape at an upper part of the transparent display unit 140.

Figure 9A:
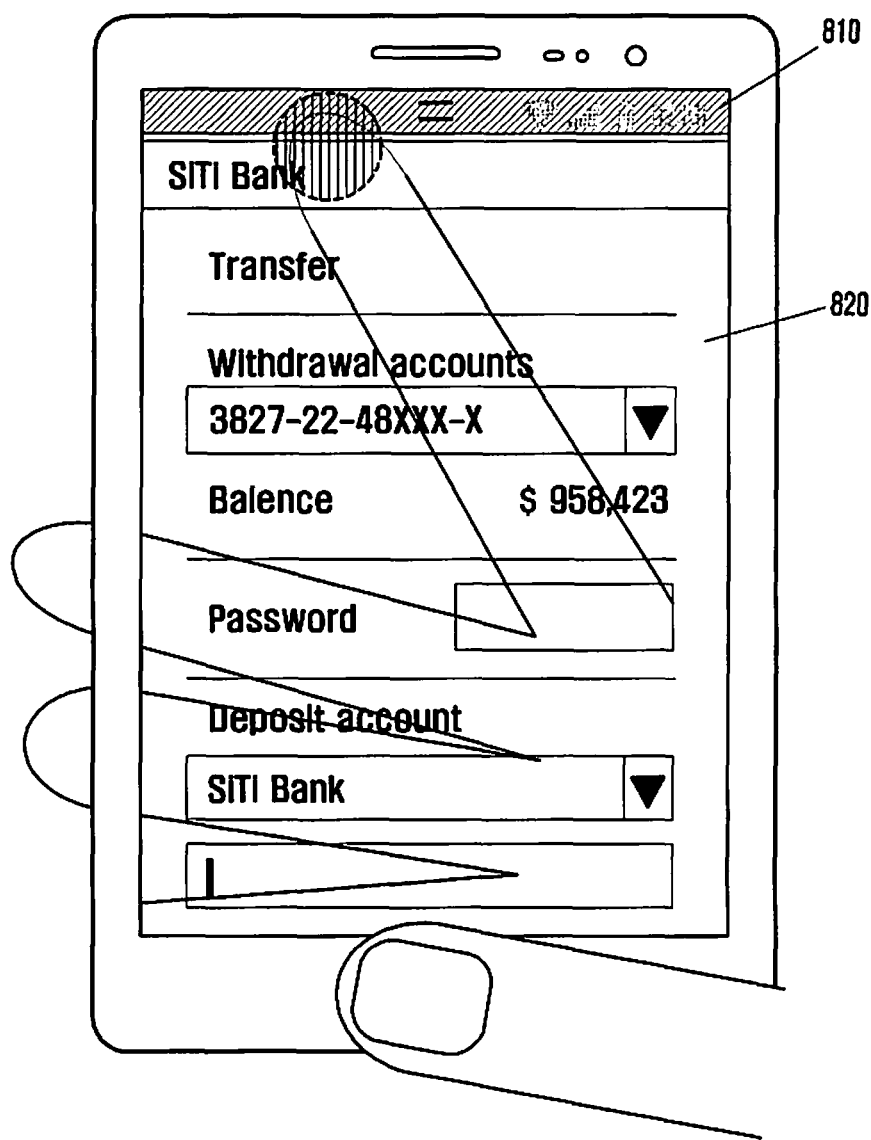
FIGS. 9A to 9D are views illustrating an example of locking or unlocking a display of a portable terminal according to an embodiment of the present invention.

Referring to FIG. 9A, the second touch screen unit 142 is in an unlock state and the index finger of the user drags the lock/unlock area 810 downward while touching the lock/unlock area 810. An execution screen which is currently being executed by the user is displayed in the execution information display area 820 of the transparent display unit 140, and is displayed in a nearly transparent state according to the unlock state of the second touch screen unit 142 regardless of the lock or unlock state of the first touch screen unit 141. In FIG. 9A, the index finger of the user touches the lock/unlock area 810 on the second touch screen unit 142.

Figure 9B:
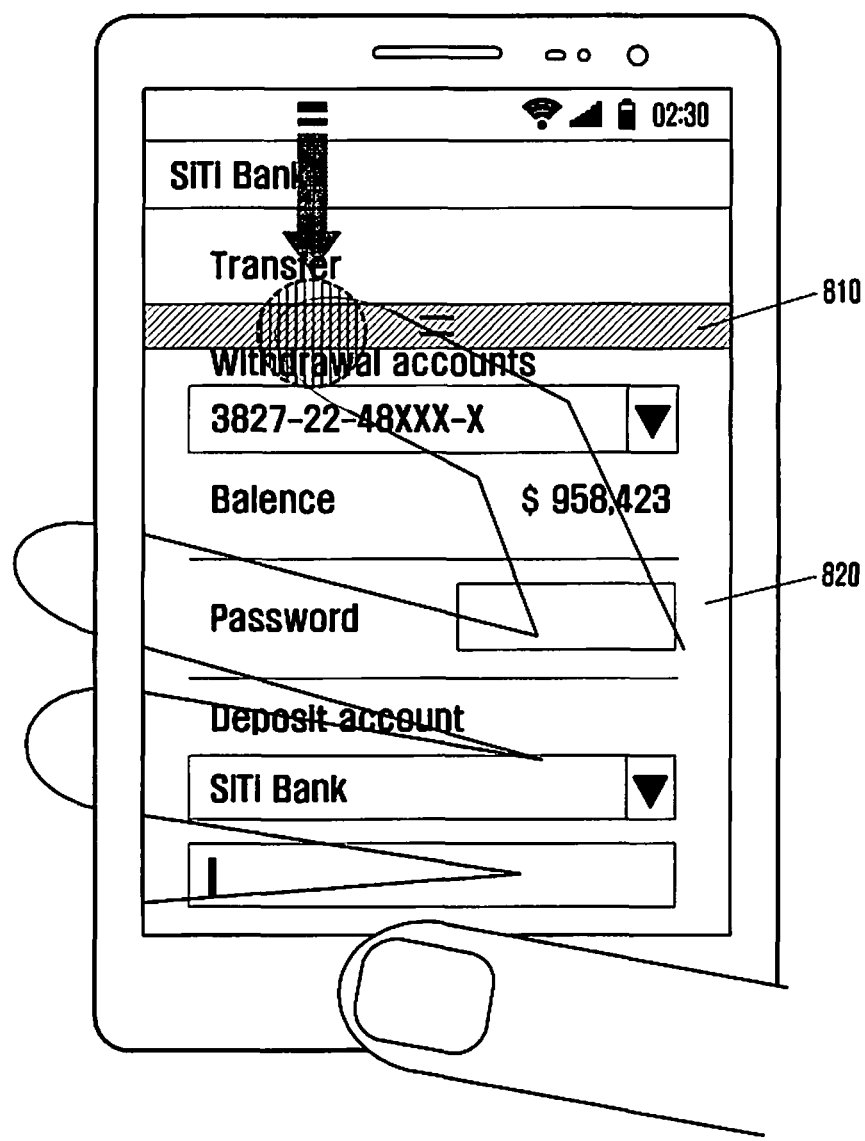

Referring to FIG. 9B, the index finger of the user is dragging the lock/unlock area 810 downward while touching the lock/unlock area 810 through the second touch screen unit 142. Using the lock/unlock area 810 as a reference, the lower execution information display area 820 is displayed in a more transparent state than the upper execution information display area 820.

Figure 9C:
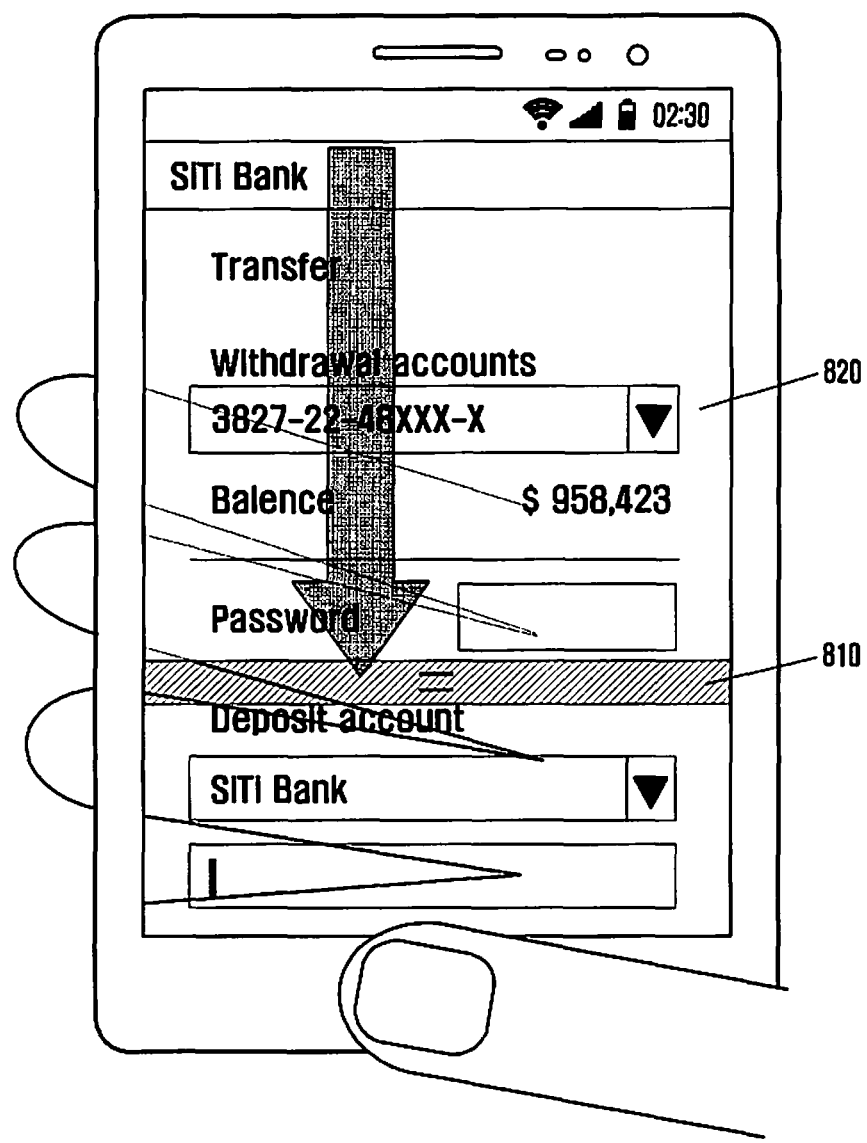

Referring to FIG. 9C, the index finger of the user moves more downward than that of FIG. 9B. The lower execution information display area 820 located at a lower position below the lock/unlock area 810 is displayed in a more transparent state than the upper execution information display area 820 located at an upper position above the lock/unlock area 810, and is distinguishable from the upper execution information display area 820. Specifically, the hand of the user seen through the transparent display unit 140 is more clearly seen in the lower execution information display area 820 than in the upper execution information display area 820.

Figure 9D:
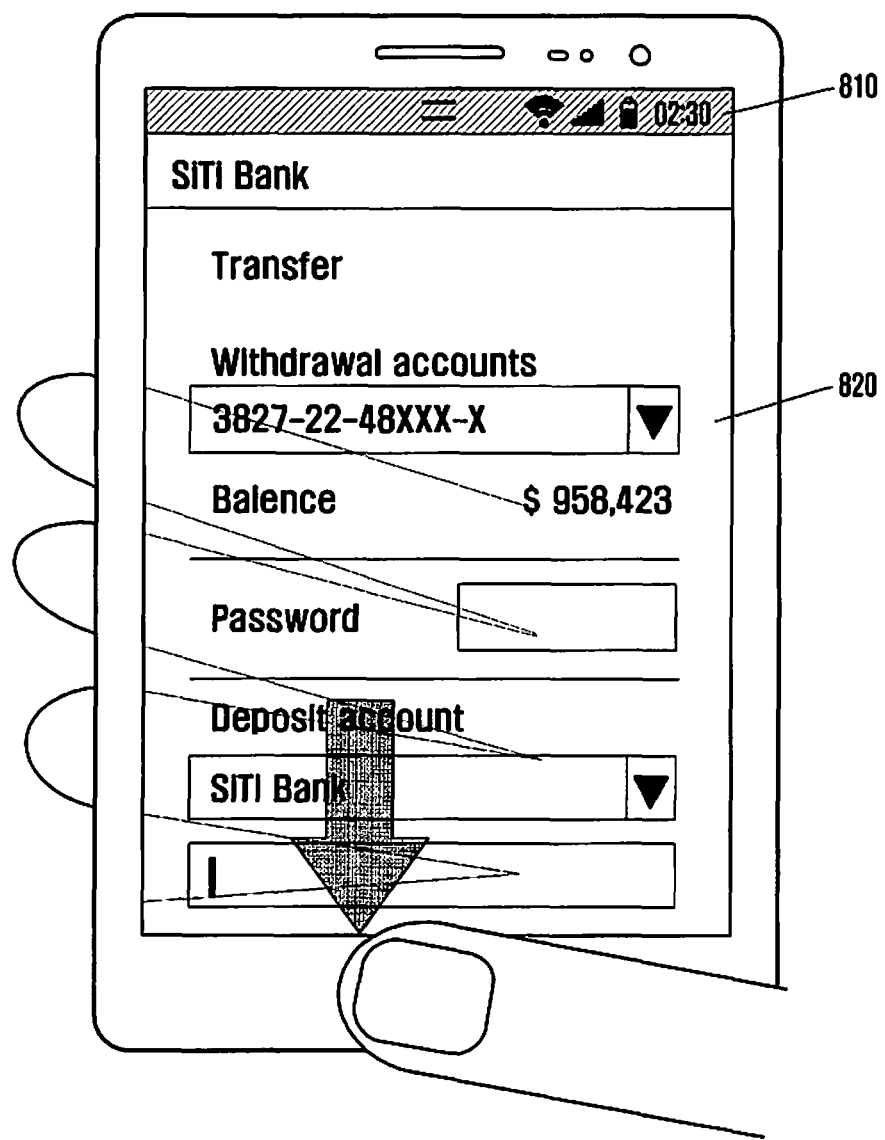

Referring to FIG. 9D, the index finger of the user moves downward to an end lower part of the transparent display unit 140. The second touch screen unit 142 is changed from an unlock state to a lock state.

In the embodiments illustrated in FIGS. 8A-8D and FIGS. 9A-9D, the process has been described for controlling the lock/unlock of the second touch screen unit 142 by touching the lock/unlock area 810 on the second touch screen unit 142. The lock/unlock of the first touch screen unit 141 may be controlled by inputting a touch to the lock/unlock area 810 on the second touch screen unit 142. The lock/unlock of the first touch screen unit 141 and the second touch screen unit 142 may be controlled by touching the lock/unlock area 810 on the second touch screen unit 142. Also, the lock/unlock of the first touch screen unit 141 may be controlled by inputting a touch to the lock/unlock area 810 on the first touch screen unit 141. The lock/unlock of the second touch screen unit 142 may be controlled by inputting a touch to the lock/unlock area 810 on the first touch screen unit 141. The lock/unlock of the first touch screen unit 141 and the second touch screen unit 142 may be controlled by inputting a touch to the lock/unlock area 810 on the first touch screen unit 141. However, it is more convenient to apply a change to both of the first touch screen unit 141 and the second touch screen unit 142 when they are both in a lock state or in an unlock state.

Further, in the embodiments illustrated in FIGS. 8A-8D and FIGS. 9A-9D, the lock/unlock area is disposed in a rectangular shape at the upper part of the transparent display unit 140. However, the lock/unlock area may be disposed at a left part, a right part, or a lower part of the transparent display unit 140.

Hereinafter, according to a user setting, in the lock state, the transparency of the transparent display unit 140 is increased and the transparent display unit 140 is displayed with the increased transparency; in an unlock state, the transparent display unit 140 is displayed opaquely. Since a lock state corresponds to opacity and an unlock state corresponds to transparentness, when the second touch screen unit 142 is in the lock state, the transparency of the transparent display unit 140 is reduced and the transparent display unit 140 is displayed to be close to opacity; when the second touch screen unit 142 is in the unlock state, the transparency of the transparent display unit 140 is increased and the transparent display unit 140 is displayed with the increased transparency.

FIGS. 10A to 10D are views illustrating an example of locking or unlocking a display of a portable terminal according to an embodiment of the present invention. FIGS. 10A to 10D illustrate an embodiment in which state information display area (hereinafter, referred to as an "indicator area 830"), which displays a communication state, a battery state, time, a message, a missed telephone call, information about whether a connection is made through short-range communication, and the like, of the portable terminal 100, is designated as a lock/unlock area and the second touch screen unit 142 is unlocked by dragging the indicator area 830 downward.

Figure 10A:
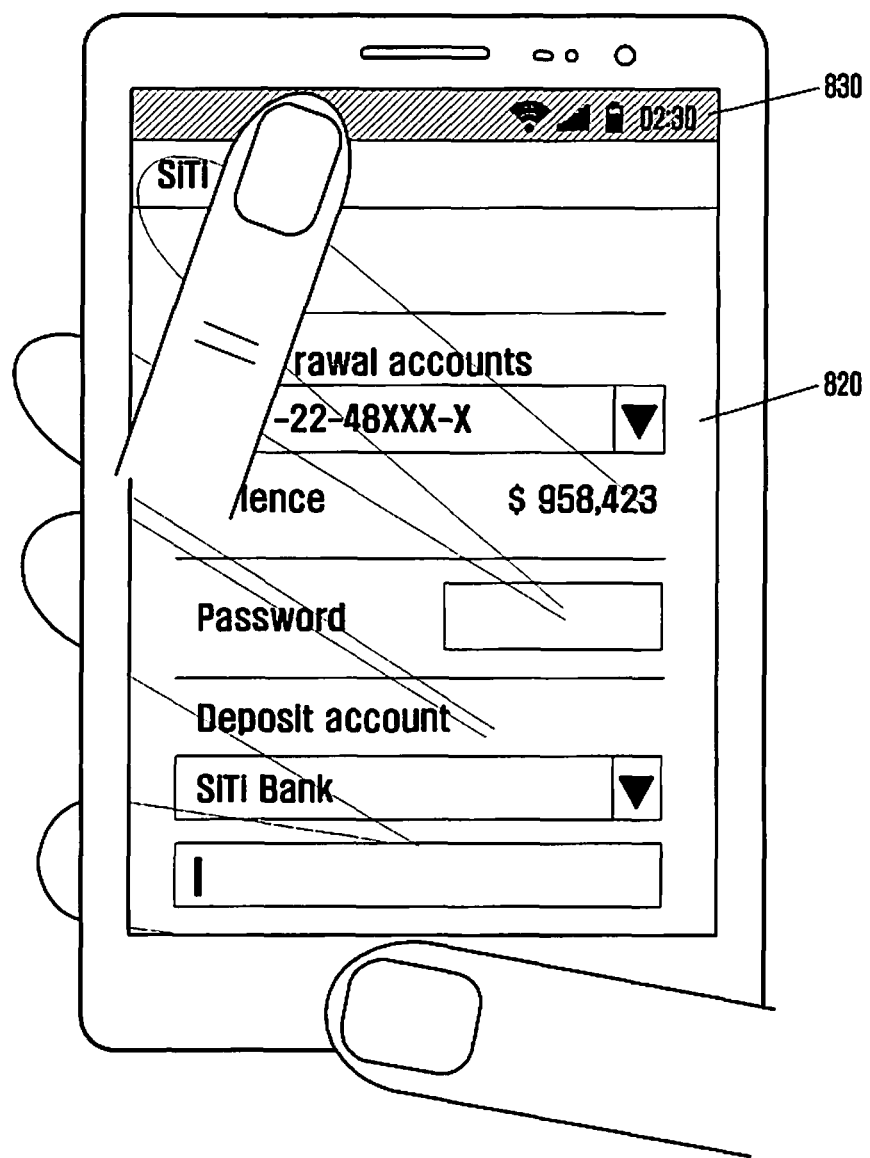
FIGS. 10A to 10D are views illustrating an example of locking or unlocking a display of a portable terminal according to an embodiment of the present invention.

Referring to FIG. 10A, the second touch screen unit 142 is in a lock state. Accordingly, a transparency of the transparent display unit 140 is displayed in a translucent state according to the lock state of the second touch screen unit 142 regardless of the lock or unlock state of the first touch screen unit 141. In FIG. 10A, an index finger of the user contacts the indicator area 830 located at an upper part of the transparent display unit 140 through the first touch screen unit 141.

Figure 10B:
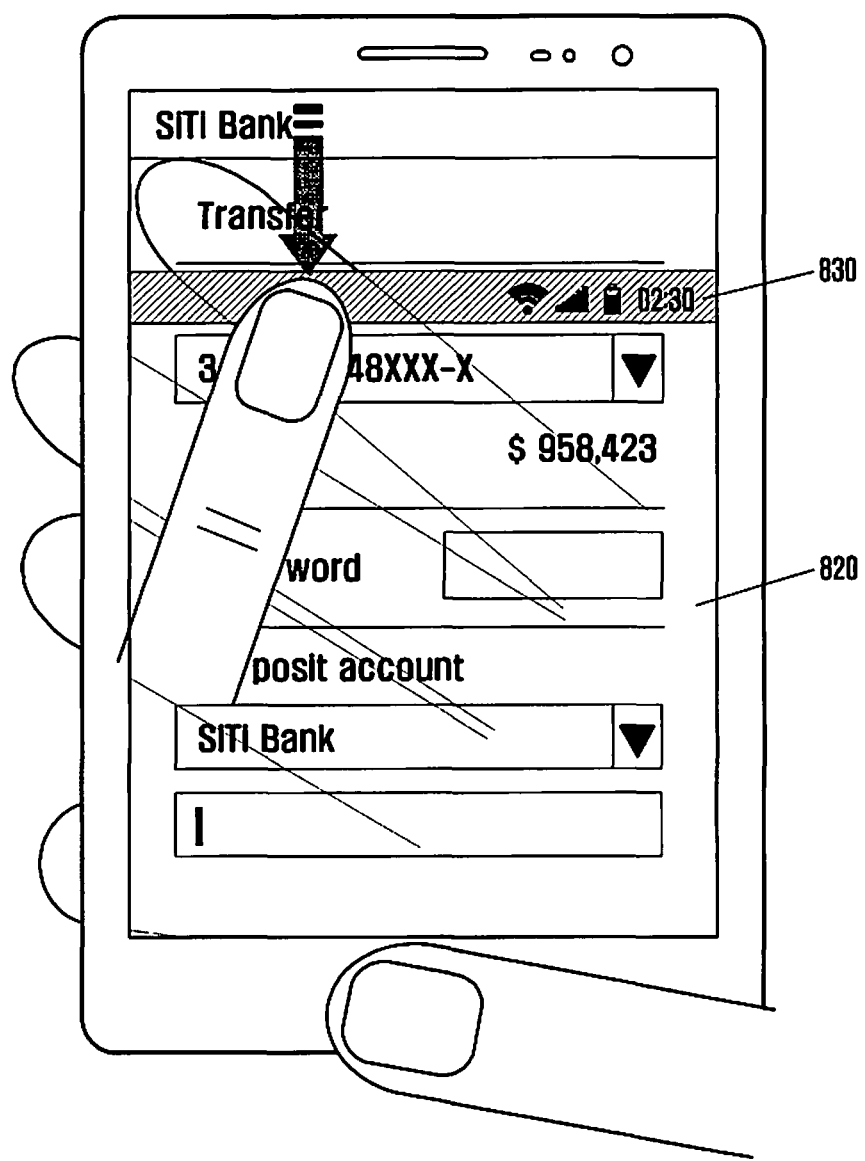

Referring to FIG. 10B, the index finger of the user drags the indicator area 830 downward while contacting the indicator area 830 on the first touch screen unit 141. In FIG. 10B, a transparency of an upper part of the execution information display area 820 above the indicator area 830 is increased, and the user can intuitively know that the second touch screen unit 142 is being changed from a lock state to an unlock state.

Figure 10C:
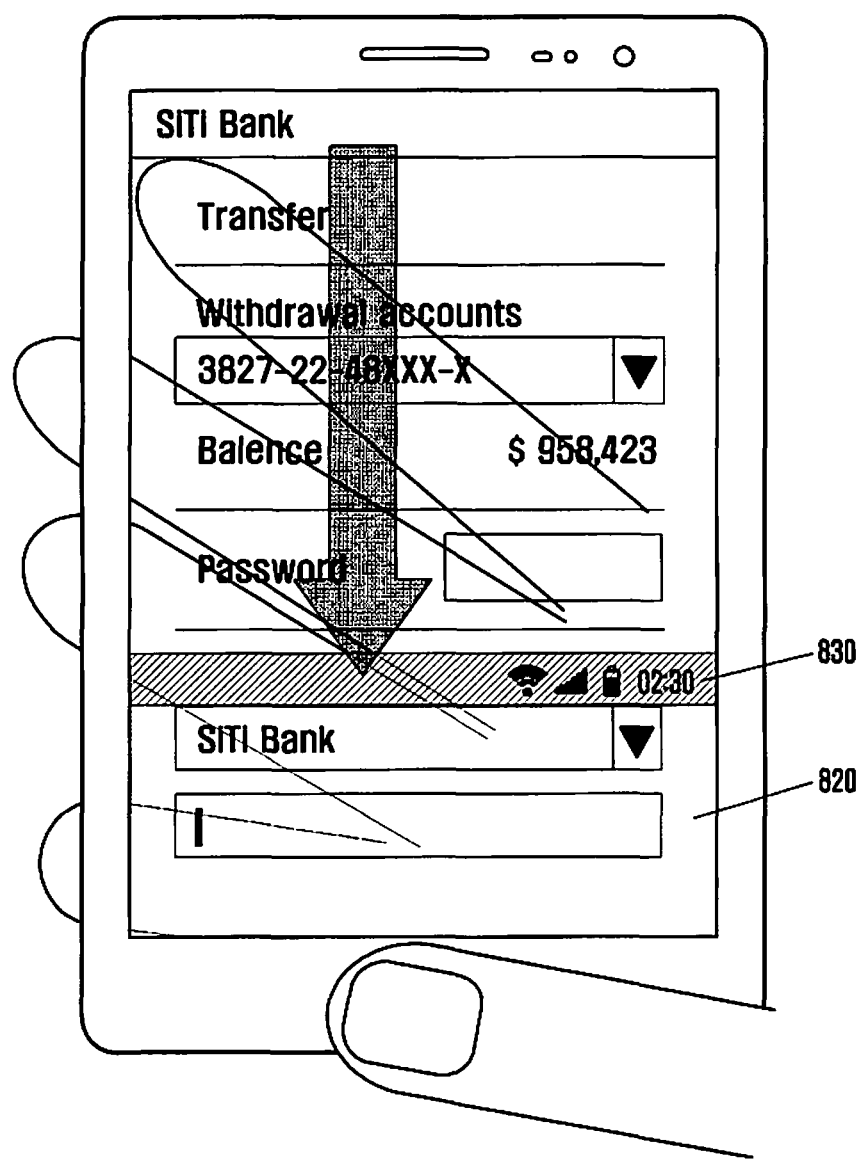

Referring to FIG. 10C, the indicator area 830 is dragged more downward than that of FIG. 10B. In FIG. 10C, a transparency of an upper part of the execution information display area 820 above the indicator area 830 is increased, and the user can intuitively know that the second touch screen unit 142 is being changed from a lock state to an unlock state.

Figure 10D:
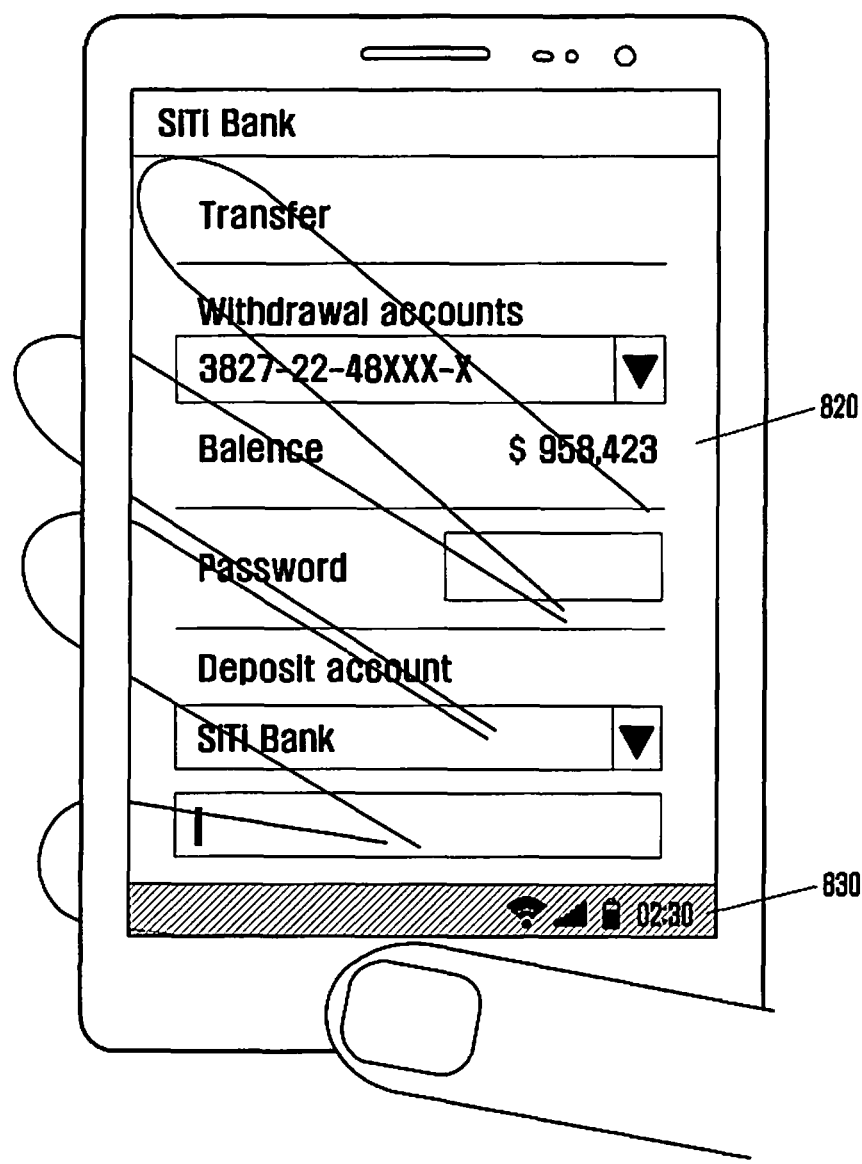

Referring to FIG. 10D, the index finger of the user drags the indicator area 830 downward to an end lower part of the transparent display unit 140 while contacting the indicator area 830 on the first touch screen unit 141. In this state, the second touch screen unit 142 is changed from the lock state to the unlock state. In FIG. 10D, the transparency of the transparent display unit 140 becomes higher while the second touch screen unit 142 is changed from the lock state to the unlock state than that of FIG. 10A.

When the second touch screen unit 142 is changed from the lock state to the unlock state according to a user setting as described above, the control unit 160 is capable of controlling the lock/unlock state by using the transparency of the transparent display unit 140.

FIGS. 11A to 11D are views illustrating an example of locking or unlocking a display of a portable terminal according to an embodiment of the present invention. FIGS. 11A to 11D illustrate an embodiment in which the indicator area 830 is designated as a lock/unlock area and the second touch screen unit 142 is locked by upward dragging the indicator area 830 located at a lower end part of the transparent display unit 140.

Figure 11A:
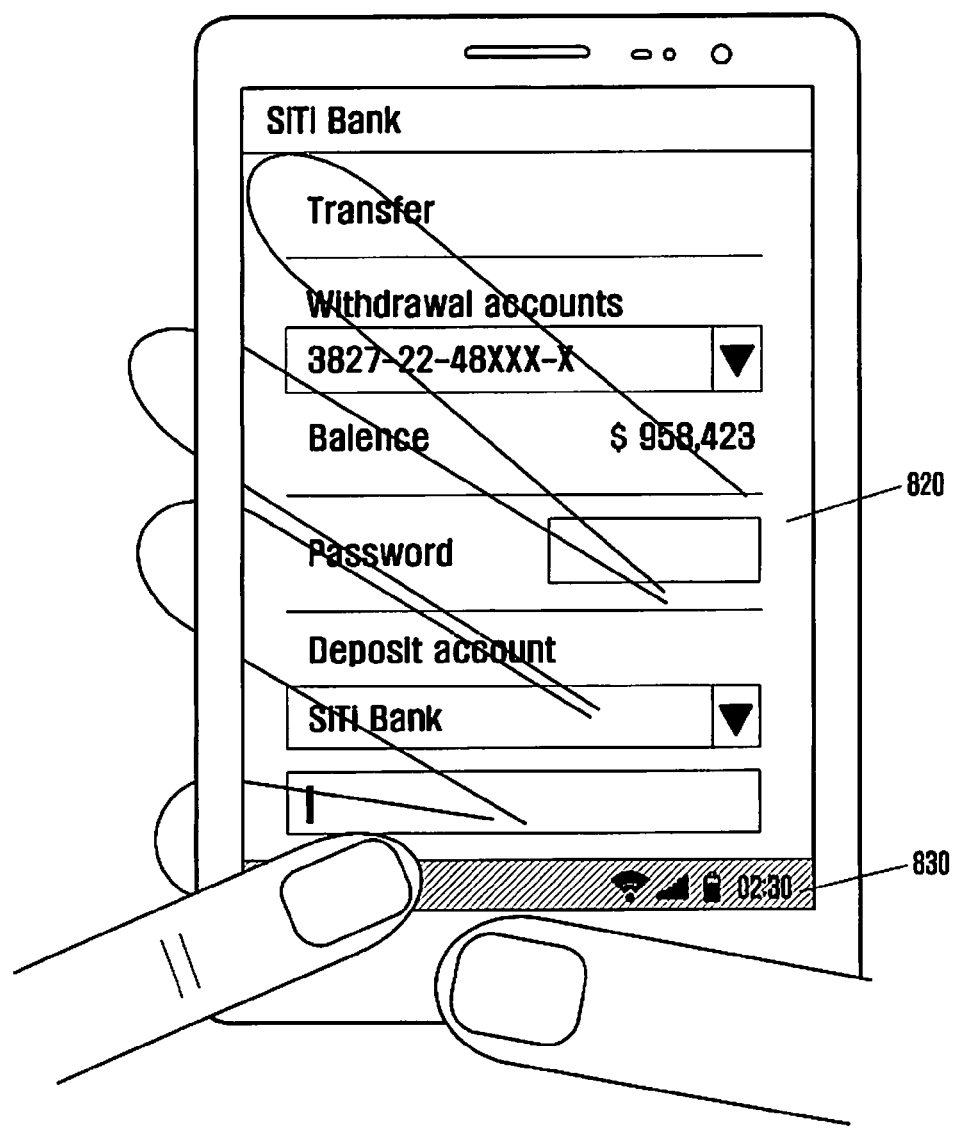
FIGS. 11A to 11D are views illustrating an example of locking or unlocking a display of a portable terminal according to an embodiment of the present invention.

Referring to FIG. 11A, the second touch screen unit 142 is in an unlock state. Accordingly, a transparency of the transparent display unit 140 is displayed in a nearly transparent state according to the unlock state of the second touch screen unit 142 regardless of the lock or unlock state of the first touch screen unit 141. In FIG. 11A, the index finger of the user contacts the indicator area 830 located at the lower end part of the transparent display unit 140 through the first touch screen unit 141.

Figure 11B:
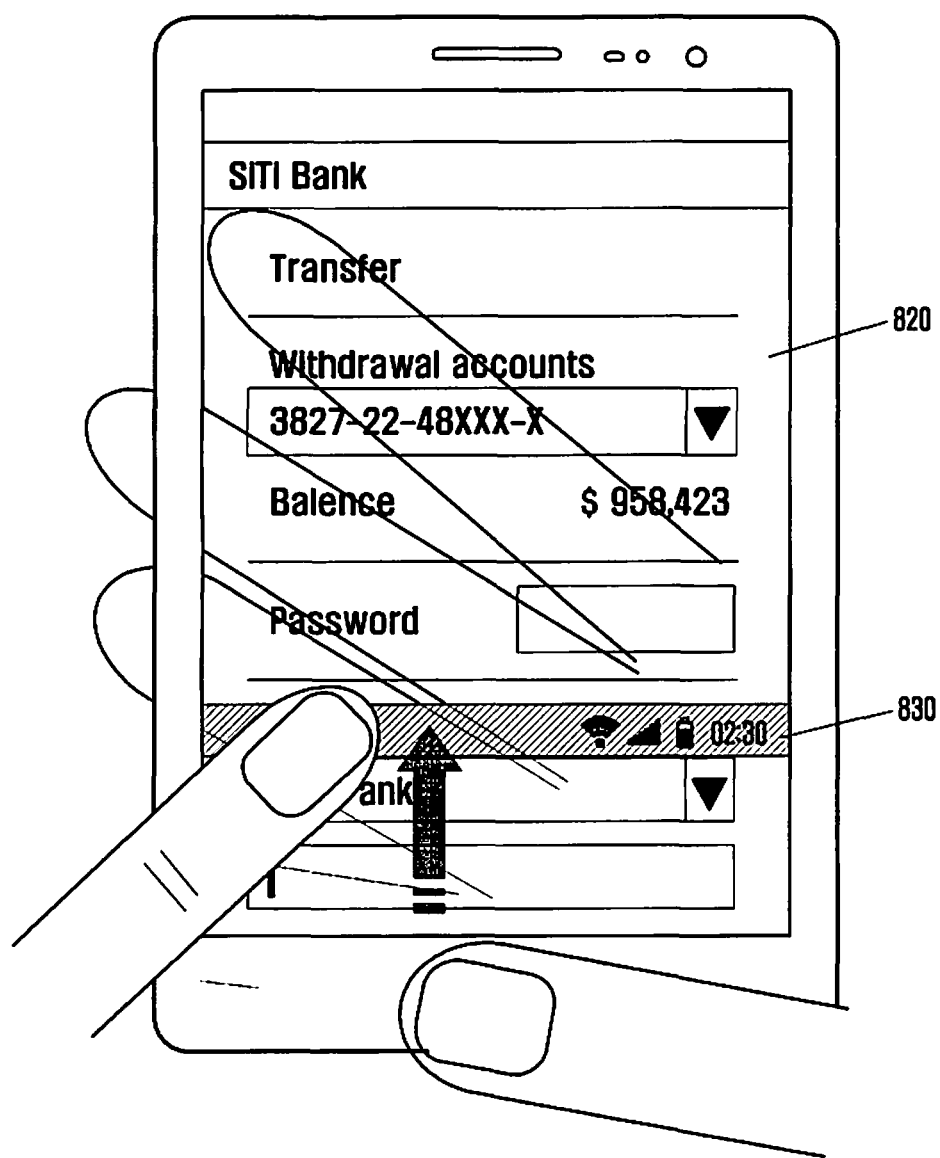

Referring to FIG. 11B, the index finger of the user partly drags the indicator area 830 upward while contacting the indicator area 830 on the first touch screen unit 141. In FIG. 11B, a transparency of a lower part of the execution information display area 820 below the indicator area 830 is reduced, and the user can intuitively know that the second touch screen unit 142 is being changed from an unlock state to a lock state.

Figure 11C:
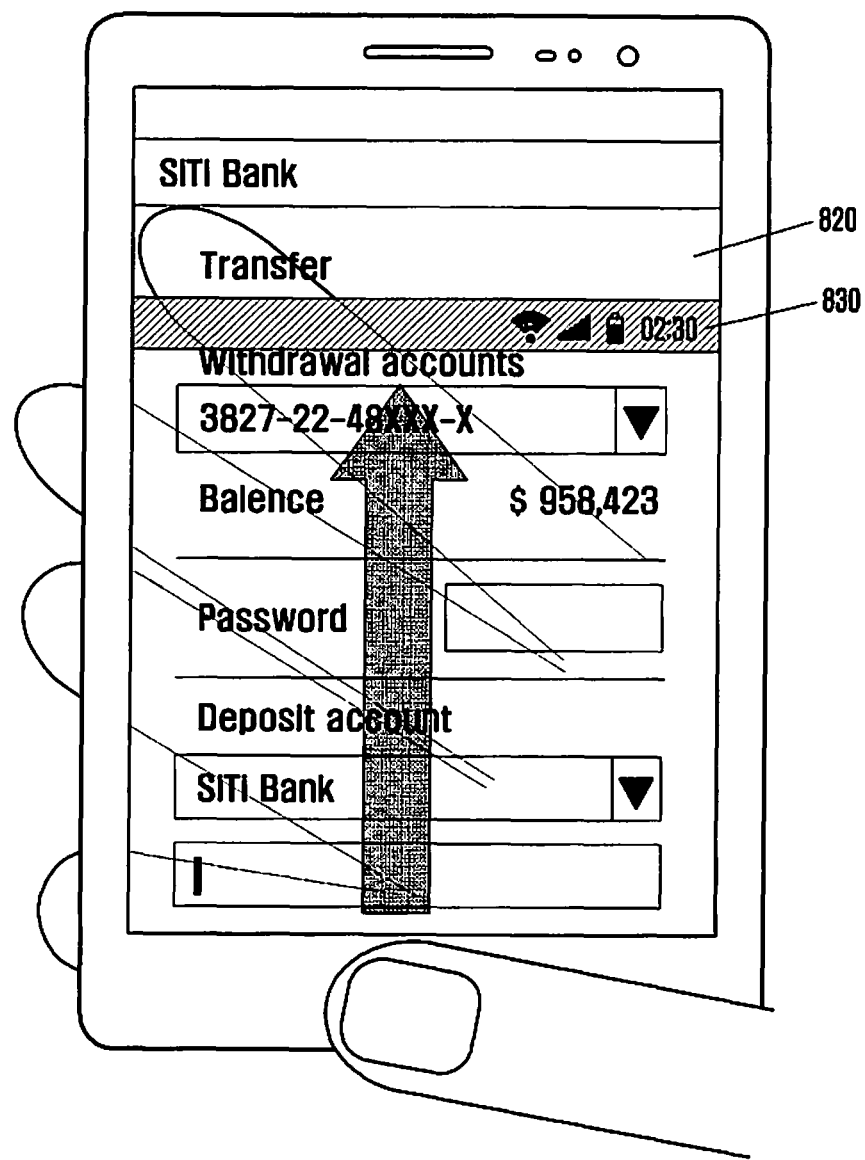

Referring to FIG. 11C, the indicator area 830 is dragged more upward than that of FIG. 11B. In FIG. 11C, a transparency of a lower part of the execution information display area 820 below the indicator area 830 is lower than that of an upper part thereof, and the user can intuitively know that the second touch screen unit 142 is being changed from an unlock state to a lock state.

Figure 11D:
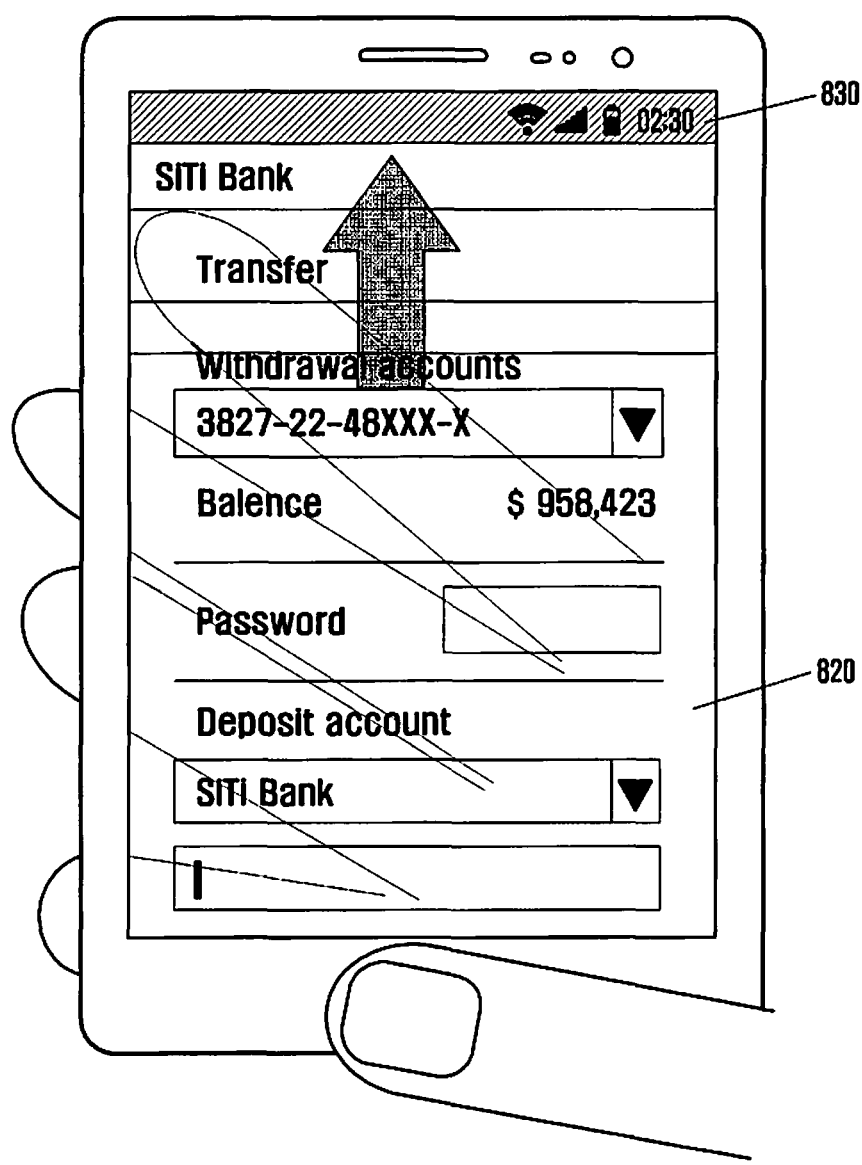

Referring to FIG. 11D, the index finger of the user drags the indicator area 830 upward to an end part of the upper part of the transparent display unit 140 while contacting the indicator area 830 on the first touch screen unit 141. In this state, the second touch screen unit 142 is changed from the unlock state to the lock state. In FIG. 11D, the transparency of the transparent display unit 140 becomes lower while the second touch screen unit 142 is changed from the unlock state to the lock state than that of FIG. 11A.

When the second touch screen unit 142 is changed from the unlock state to the lock state according to a user setting as described above, the control unit 160 is capable of controlling the lock/unlock state by using the transparency of the transparent display unit 140.

With reference to FIGS. 10A-10D and FIGS. 11A-11D, the process has been described for controlling the second touch screen unit 142 by inputting a touch to the indicator area 830 through the first touch screen unit 141. The lock/unlock state of the first touch screen unit 141 may be controlled through the first touch screen unit 141. When the first touch screen unit 141 and the second touch screen unit 142 are both in the lock state or in the unlock state, the lock/unlock state of the first touch screen unit 141 and the lock/unlock state of the second touch screen unit 142 may be controlled through the first touch screen unit 141. Also, the lock/unlock state of the second touch screen unit 142 may be controlled through the second touch screen unit 142. When the first touch screen unit 141 and the second touch screen unit 142 are both in the lock state or in the unlock state, the lock/unlock state of the first touch screen unit 141 and the lock/unlock state of the second touch screen unit 142 may be simultaneously controlled through either the first touch screen unit 141 or the second touch screen unit 142.

The examples illustrated in FIGS. 8A-8D, FIGS. 9A-9D, FIGS. 10A-10D and FIGS. 11A-11D have been described in each of which a drag gesture is performed as a touch action. However, a hovering action may also apply.

Figure 12A:
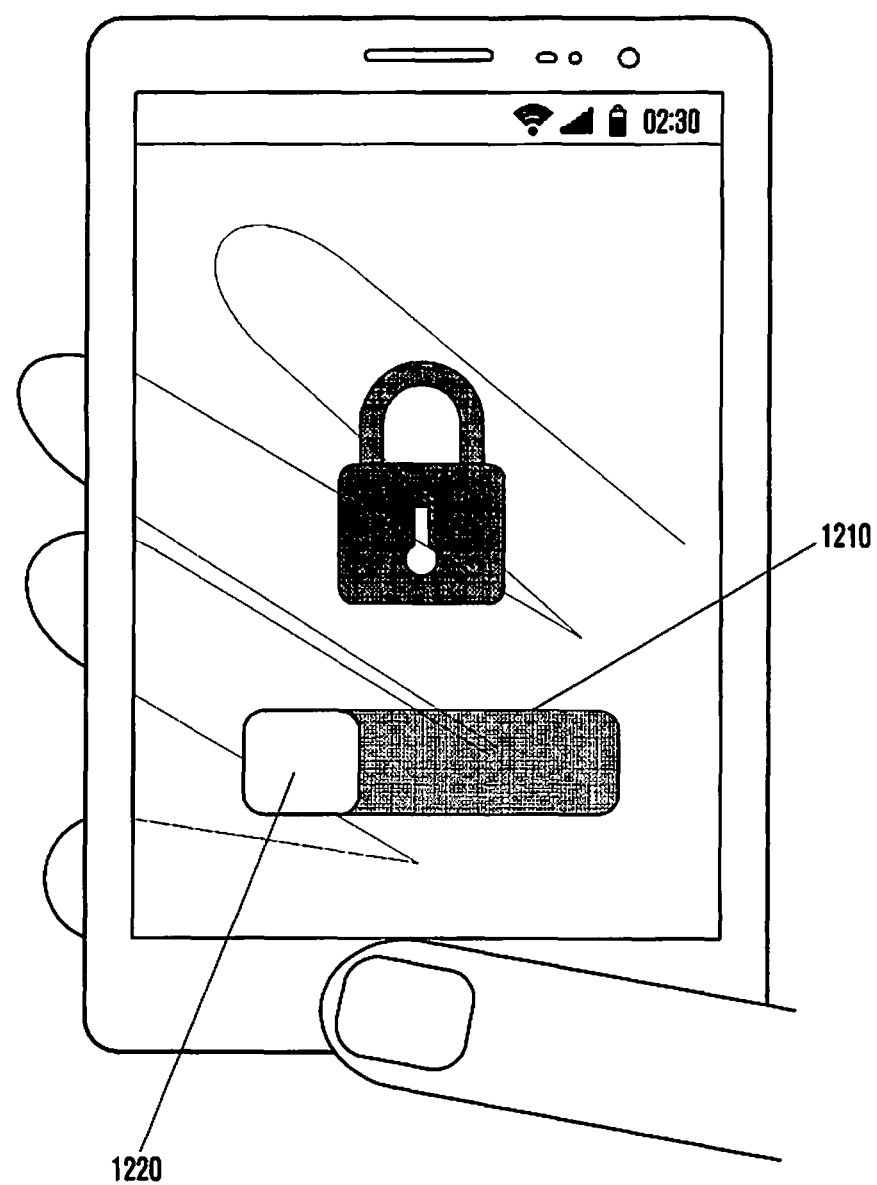
FIGS. 12A to 12C are views illustrating an example of locking or unlocking a display of a portable terminal according to an embodiment of the present invention.
Figure 12B:
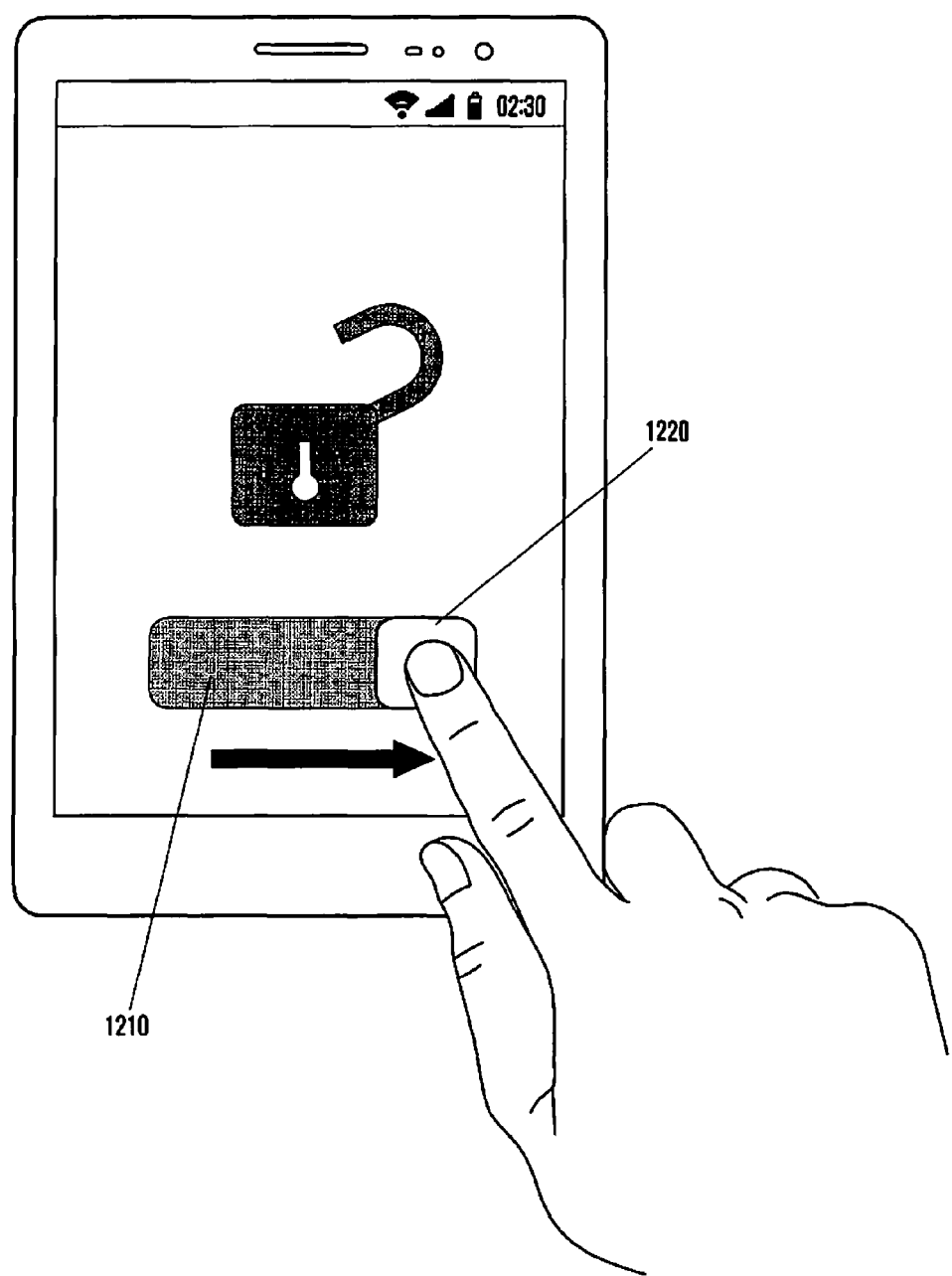
Figure 12C:
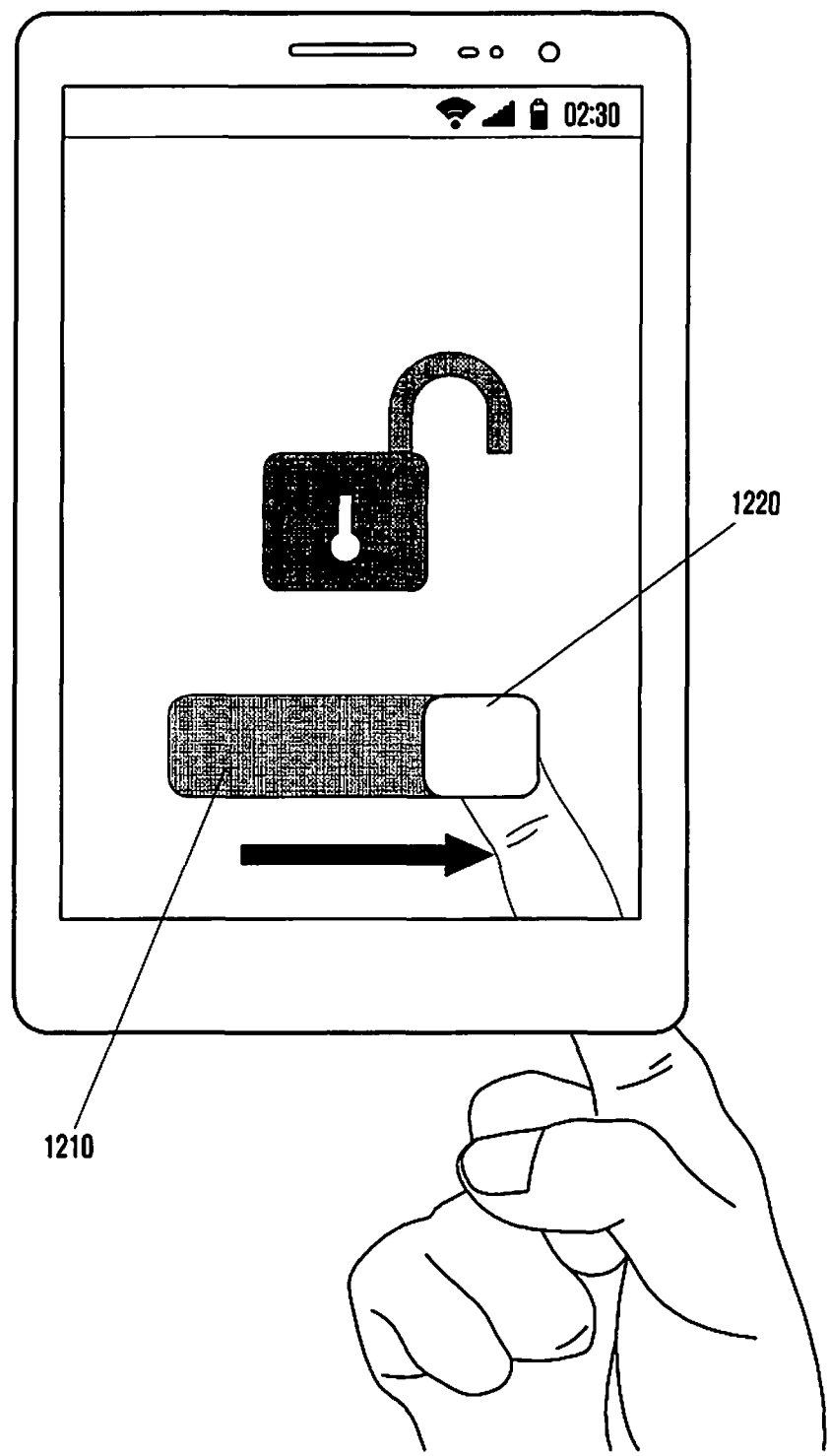

FIGS. 12A to 12C are views illustrating an example of locking or unlocking a display of a portable terminal according to an embodiment of the present invention. Referring to FIGS. 12A to 12C, the convenience of the user is improved by displaying icons respectively representing lock (refer to FIG. 12A), partial lock (refer to FIG. 12B), and unlock (refer to FIG. 12C) in a UI.

Referring to FIG. 12A, a lock-shaped icon indicating a lock state is displayed at an upper part of the transparent display unit 140. The lock/unlock area 1210 and an indicator 1220 capable of moving from side to side within the lock/unlock area 1210 for controlling lock/unlock states are displayed at a lower part of the transparent display unit 140. In FIG. 12A, the first touch screen unit 141 and the second touch screen unit 142 are both in a lock state.

Referring to FIG. 12B, unlocking one (e.g., the first touch screen unit 141) of the first touch screen unit 141 and the second touch screen unit 142 is performed through a lock/unlock area on the first touch screen unit 141. As illustrated in FIG. 12B, a lock-shaped icon located at an upper position above the lock/unlock area 1210 is changed to a half opened, i.e., a partial lock-shaped icon, by moving the indicator 1220 within the lock/unlock area 1210 to the right, indicating that only one of the first touch screen unit 141 and the second touch screen unit 142 is in an unlock state.

Referring to FIG. 12C, unlocking the first touch screen unit 141 and the second touch screen unit 142 are performed by moving the indicator 1220 within the lock/unlock area 1210 of the second touch screen unit 142 from the left to the right. At this time, the lock-shaped icon located at an upper position above the lock/unlock area 1210 becomes a completely opened, i.e., unlock-shaped icon.

Figure 13A:
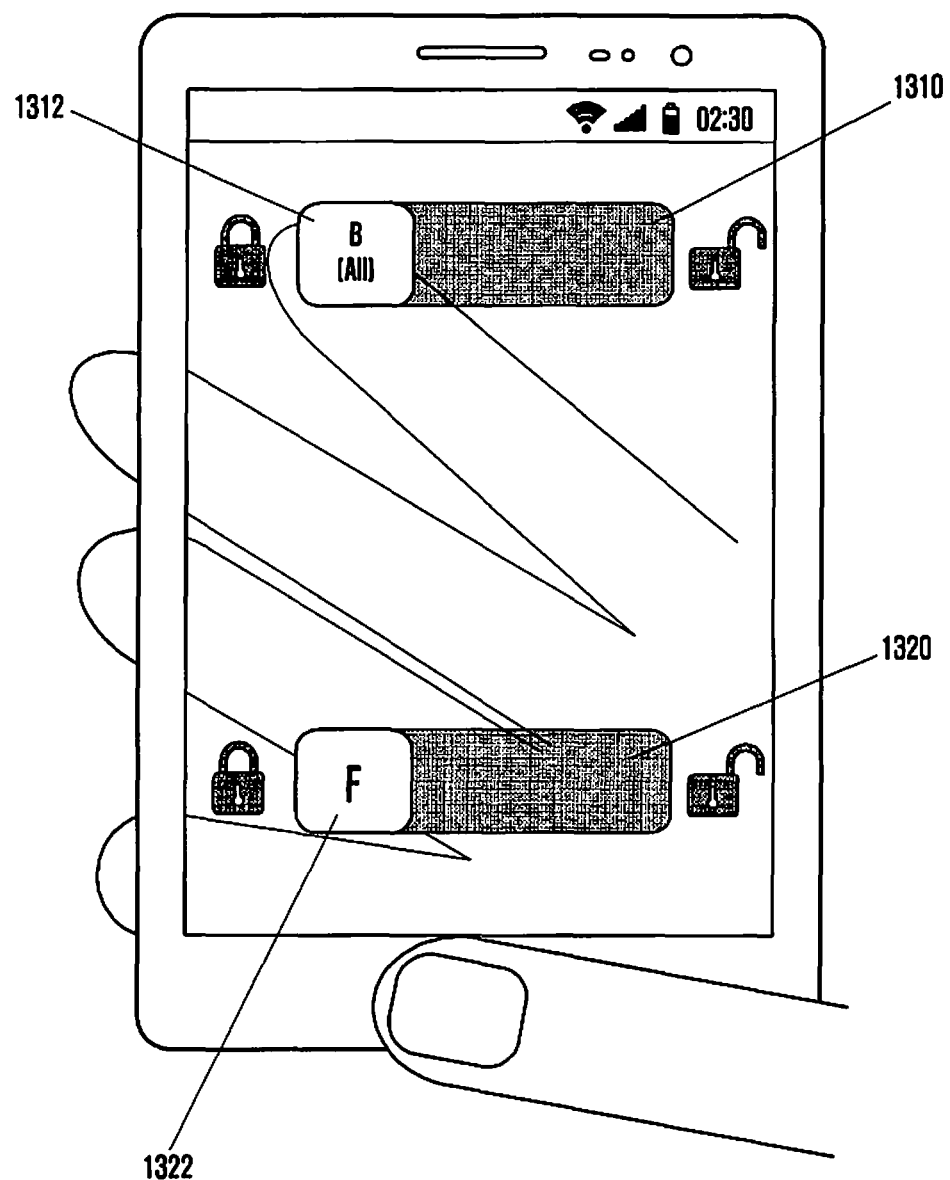
FIGS. 13A to 13C are views illustrating an example of locking or unlocking a display of a portable terminal according to an embodiment of the present invention.
Figure 13B:
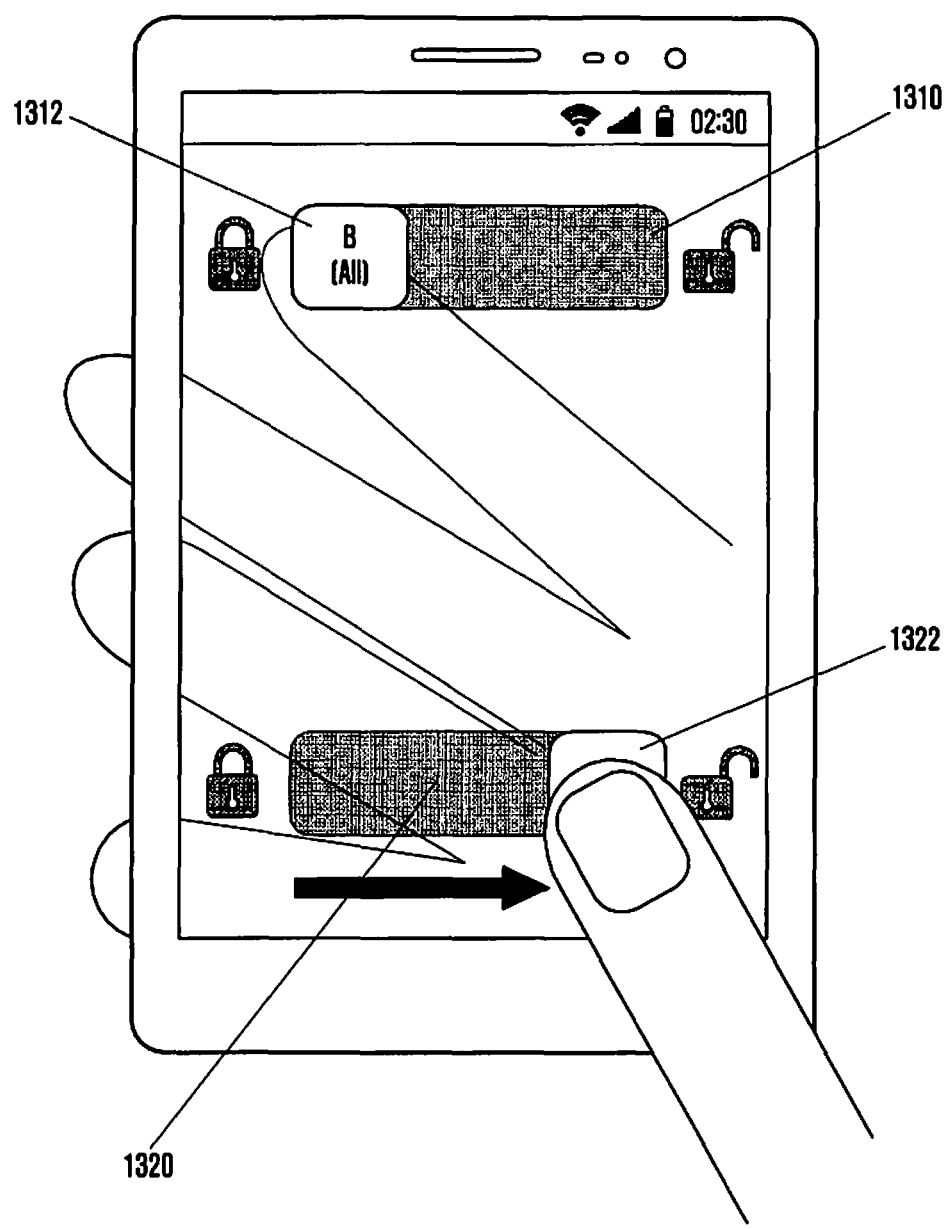
Figure 13C:
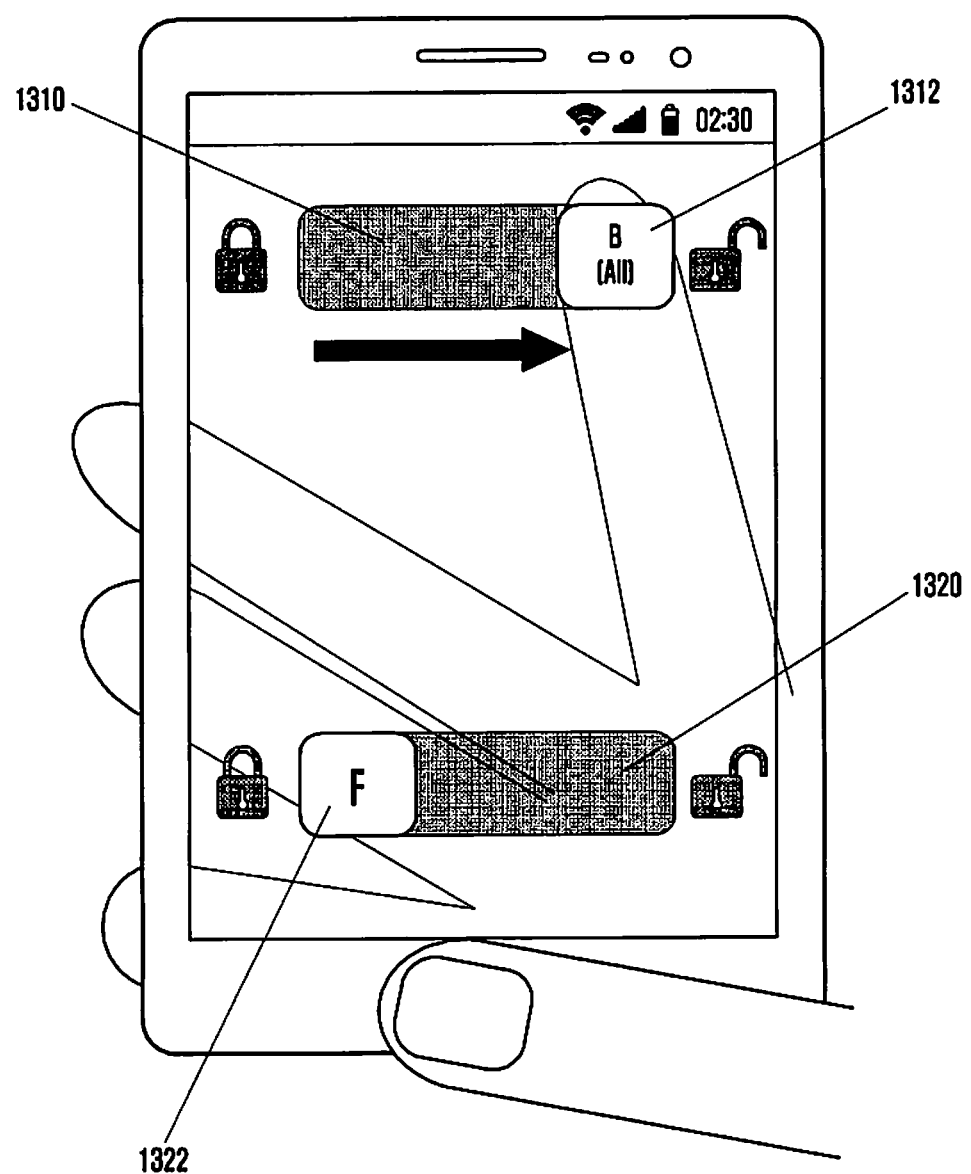

FIGS. 13A to 13C are views illustrating an example of locking or unlocking a display of a portable terminal according to an embodiment of the present invention. FIGS. 13A to 13C illustrate an embodiment of using two separate UIs for controlling lock/unlock states on the transparent display unit 140.

Referring to FIG. 13A, two lock/unlock areas 1310 and 1320 are disposed at an upper part and a lower part of the transparent display unit 140, respectively. The control unit 160 is configured to be capable of controlling the lock/unlock states of the first touch screen unit 141 and that of the second touch screen unit 142 through the lock/unlock areas 1310 and 1320, respectively. A lock/unlock area disposed at the upper part is referred to as a "first UI area 1310," and a lock/unlock area disposed at the lower part is referred to as a "second UI area 1320." The first UI area 1310 is set as an area capable of simultaneously controlling the lock/unlock state of the first touch screen unit 141 and that of the second touch screen unit 142. The second UI area 1320 is set as an area capable of controlling the lock/unlock state of the first touch screen unit 141. However, the arrangement between the area and the controlled screen is not limited thereto. For example, according to a setting, the lock/unlock state of the second touch screen unit 142 may be controlled through the second UI area 1320.

Referring to FIG. 13B, the lock state of the first touch screen unit 141 is changed to the unlock state according to a touch input by the user which is input in the second UI area 1320 on the first touch screen unit 141. In FIG. 13B, the control unit 160 controls the lock/unlock state of the first touch screen unit 141 in response to a touch is input to the second UI area 1320 on the first touch screen unit 141. However, the control unit 160 may control the lock/unlock state of the first touch screen unit 141 in response to a touch, which is input to the second UI area 1320, regardless of whether the touch is on the first touch screen unit 141 or on the second touch screen unit 142. Alternatively, according to a setting, the control unit 160 may be configured to lock or unlock any one of the first touch screen unit 141 and the second touch screen unit 142 in response to a touch which is input to the first UI area 1310.

Referring to FIG. 13C, the lock state of the first touch screen unit 141 and that of the second touch screen unit 142 are both changed to the unlock state in response to a touch which is input the first UI area 1310 on the second touch screen unit 142. In FIG. 13C, a touch is input to the second UI area 1310 on the second touch screen unit 142. However, the control unit 160 may control the first touch screen unit 141 and the second touch screen unit 142 to be simultaneously changed from a lock state to an unlock state, when a touch is input to the first UI area 1310, regardless of whether the touch is on the first touch screen unit 141 or on the second touch screen unit 142.

In FIGS. 13A to 13C, lock is designated for an indicator located at the left side of each UI area, and unlock is designated for an indicator located at the right side of each UI area. However, unlock may be designated for the indicator located at the left side of each UI area, and lock may be designated for the indicator located at the right side of each UI area.

Figure 14:
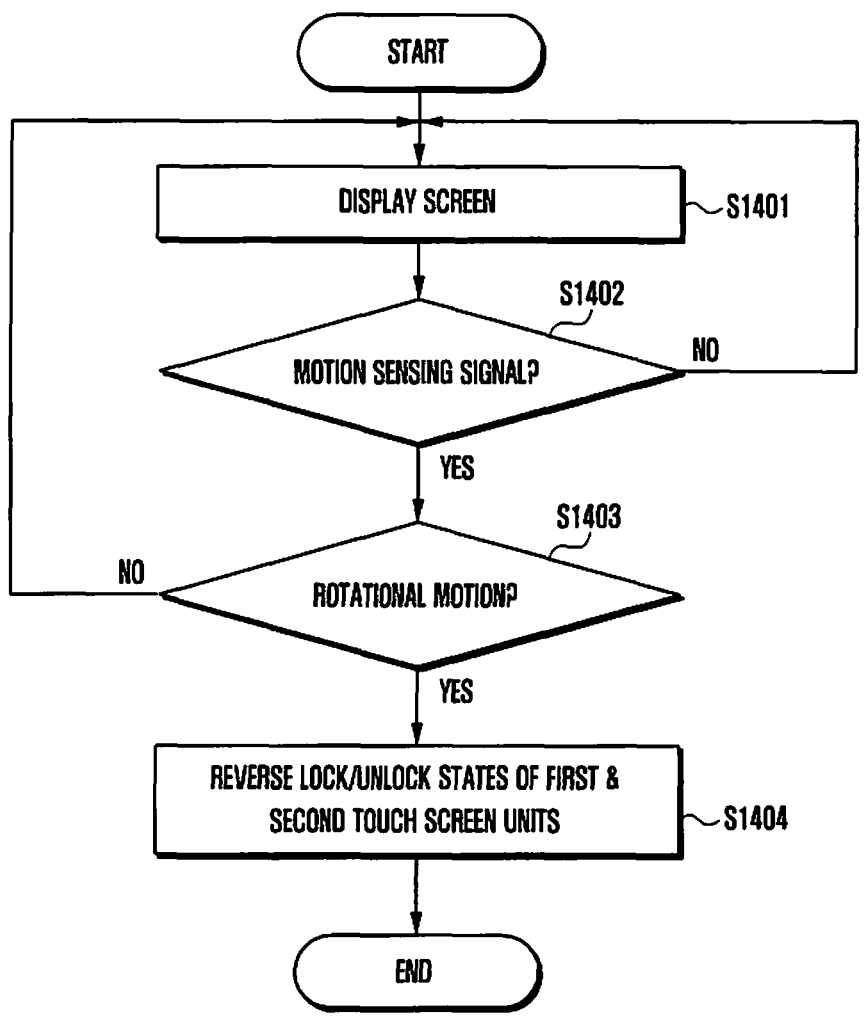
FIG. 14 is a flowchart illustrating a process for changing between a lock state and an unlock state of a display of a portable terminal according to an embodiment of the present invention.

FIG. 14 is a flowchart illustrating a process for changing between a lock state and an unlock state of a display of a portable terminal according to an embodiment of the present invention.

Referring to FIG. 14, in step S1401, when the user turns power on through the input unit 120, the control unit 160 displays an initial screen. In step S1402, the control unit 160 senses a motion of the portable terminal 100 through the motion sensor 172, and determines whether a motion sensing signal is received.

When the motion sensing signal is received in step S1402, in step S1403, the control unit 160 determines whether the motion sensing signal has been generated by rotation which changes directions in which the first touch screen unit 141 and the second touch screen unit 142 face. For example, the control unit 160 determines whether the motion sensing signal has been generated by a change in directions, in which the first touch screen unit 141 the second touch screen unit 142 respectively face, caused by rotation around 180 degrees of the portable terminal 100.

When it is determined in step S1403 that the motion sensing signal has been generated by rotating the directions in which the first touch unit 141 and the second touch screen unit 142 respectively face, in step S1404, the control unit 160 reverses lock/unlock states of the first touch screen unit 141 and the second touch screen unit 142. For example, when the first touch screen unit 141 is in the unlock state and the second touch screen unit 142 is in the lock state, if the motion sensor 172 senses that the directions have been mutually reversed, the control unit 160 sets the first touch screen unit 141 to be locked, and sets the second touch screen unit 142 to be unlocked. In response to the setting, the control unit 160 displays a screen, in such a manner as to reverse a left part and a right part or reverse an upper part and a lower part of the screen originally displayed in the transparent display unit 140.

Figure 15A:
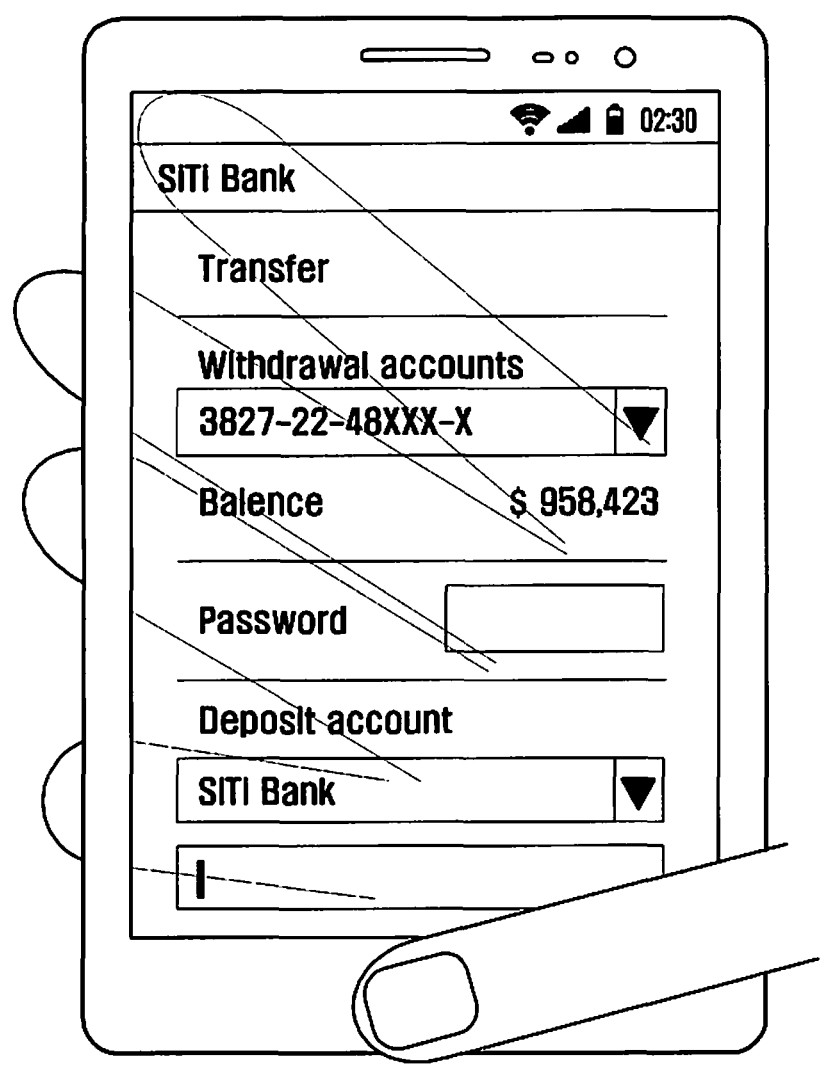
FIGS. 15A to 15C are views illustrating an example of changing between a lock state and an unlock state of a display of a portable terminal in the process illustrated in FIG. 14, according to an embodiment of the present invention.
Figure 15B:
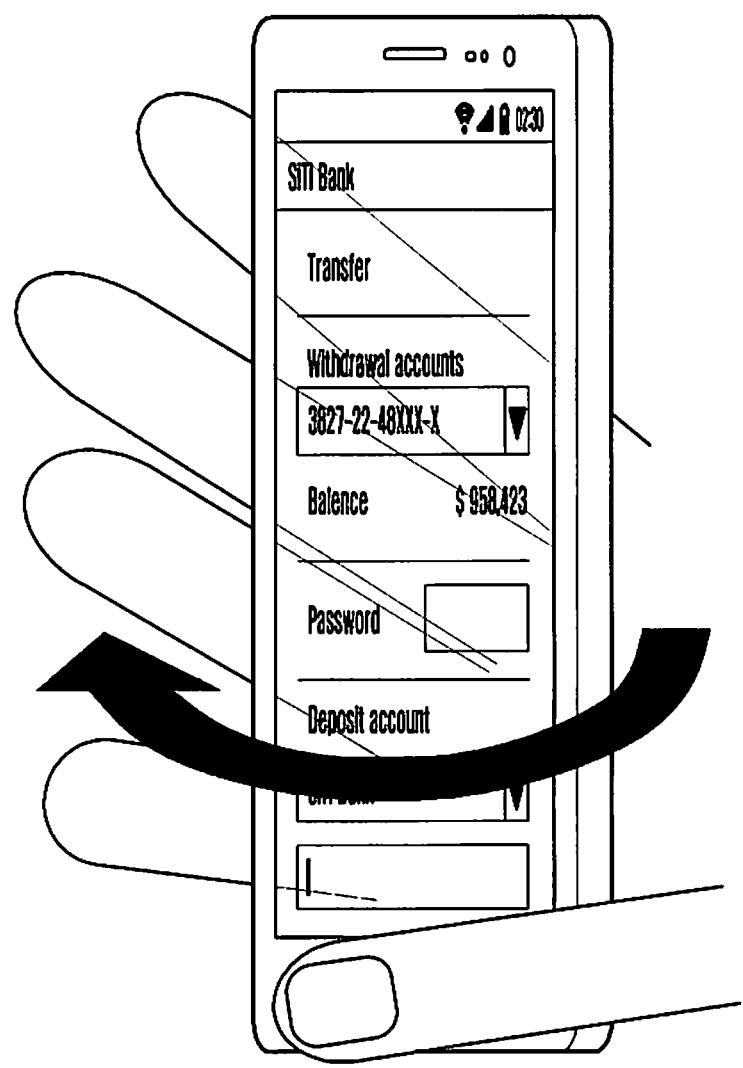
Figure 15C:
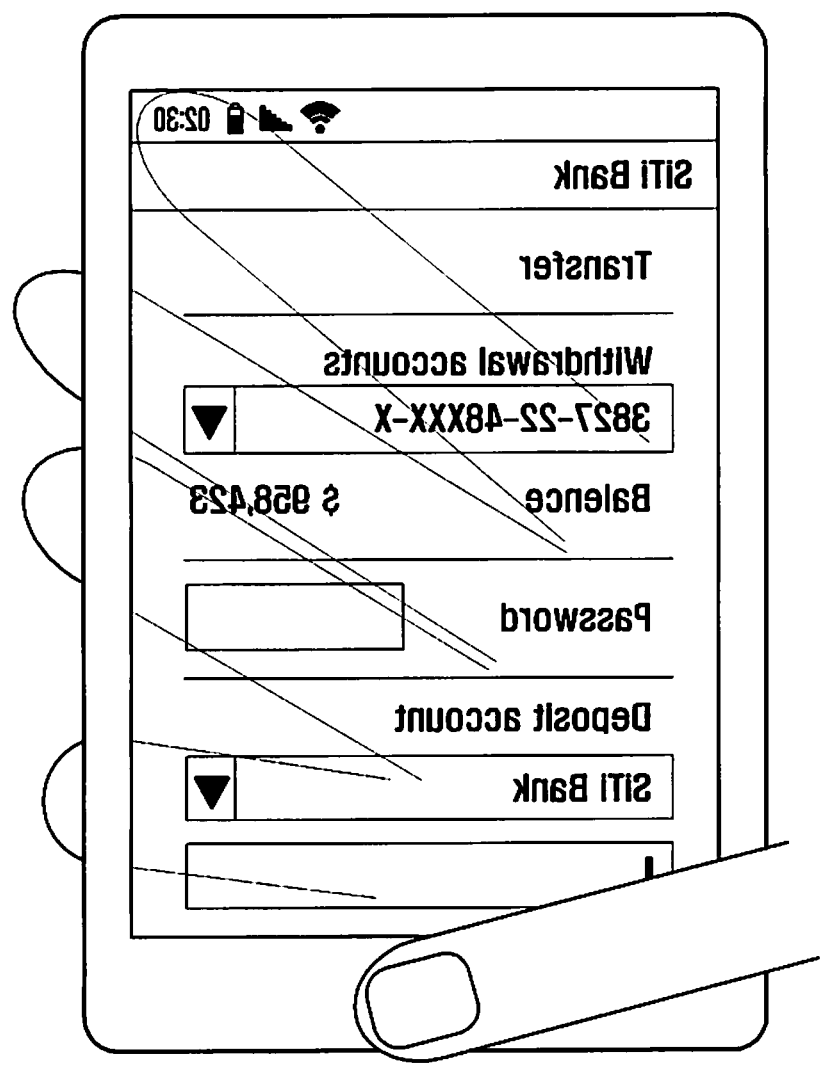

FIGS. 15A to 15C are views illustrating an example of changing between a lock state and an unlock state of a display of a portable terminal in the process illustrated in FIG. 14 according to an embodiment of the present invention.

Referring to FIG. 15A, the portable terminal 100 including the transparent display unit 140 according to an embodiment of the present invention is operating in a translucent state. In FIG. 15A, the first touch screen unit 141 is in an unlock state and the second touch screen unit 142 is in a lock state.

Referring to FIG. 15B, the portable terminal 100 is in a rotation from the portable terminal illustrated in FIG. 15A. FIG. 15B illustrates a state where an operation sensing signal is not yet generated and the front surface and rear surface of the portable terminal 100 are not reversed.

Referring to FIG. 15C, the front surface as the first touch screen unit 141 and the rear surface as the second touch screen unit 142 of the portable terminal 100 have been reversed. For example, characters illustrated in FIG. 15C are displayed left-right reversed. When the rotation around 180 degrees of the portable terminal 100 changes the directions in which the first touch screen unit 141 and the second touch screen unit 142 face, the lock/unlock states of the first touch screen unit 141 and the second touch screen unit 142 are reversed. For example, when the first touch screen unit 141 is in the unlock state and the second touch screen unit 142 is in the lock state as illustrated in FIG. 15A, and after the above-described rotation of the portable terminal 100 as illustrated in FIG.

15C, the first touch screen unit 141 is automatically set to a lock state and the second touch screen unit 142 is automatically set to an unlock state.

FIG. 15C illustrates reversing the left and the right of the characters in order to display that the directions have been changed in which the first touch screen unit 141 and the second touch screen unit 142 face. However, when sensing that the directions have been changed and reversed in which the first touch screen unit 141 and the second touch screen unit 142 face, the control unit 160 may display the characters by reversing the left and the right of the characters again for the characters to be easy to read.

Figure 16:
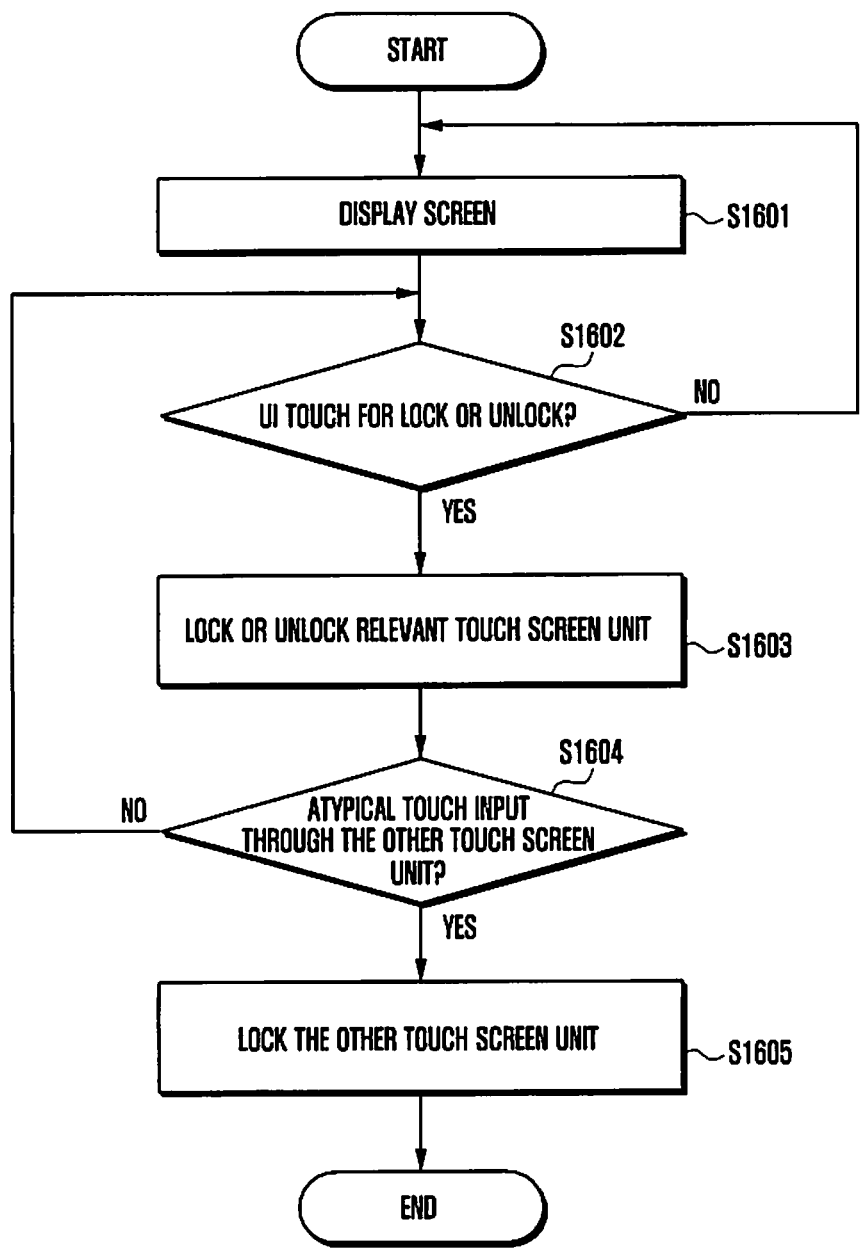
FIG. 16 is a flowchart illustrating a process for automatically controlling to lock a touch screen of a portable terminal according to an embodiment of the present invention.

FIG. 16 is a flowchart illustrating a process for automatically controlling to lock a touch screen of a portable terminal according to an embodiment of the present invention.

Referring to FIG. 16, a lock touch or an unlock touch is input to a lock/unlock area through the first touch screen unit 141, and an atypical touch is input to an area other than a lock/unlock area through the second touch screen unit 142.

In step S1601, when the user turns power on through the input unit 120, the control unit 160 performs a control operation for displaying an initial screen. Here, the control unit 160 displays, on one side of the transparent display unit 140, a lock/unlock area capable of locking or unlocking the first touch screen unit 141 and the second touch screen unit 142 regardless of the lock or unlock state of the first touch screen unit 141 and that of the second touch screen unit 142.

In step S1602, the control unit 160 determines whether a touch for locking or unlocking has been input to the lock/unlock area through the first touch screen unit 141. When it is determined in step S1602 that the lock touch or unlock touch has been input to the lock/unlock area through the first touch screen unit 141, in step S1603, the control unit 160 locks or unlocks the first touch screen unit 141. For example, when a touch for unlocking the first touch screen unit 141 has been input through the first touch screen unit 141, the control unit 160 unlocks the first touch screen unit 141.

In step S1604, the control unit 160 determines whether an atypical touch has been input through the second touch screen unit 142. The atypical touch may refer to touching the second touch screen unit 142 while the lock/unlock area is not being touched, or dragging in a direction other than a predetermined direction after the lock/unlock area is touched or maintaining the touch while the lock/unlock area is still being touched.

When it is determined in step S1604 that the atypical touch has been input through the second touch screen unit 142, in step S1605, the control unit 160 locks the second touch screen unit 142. For example, when a touch for unlocking the first touch screen unit 141 has been input through the first touch screen unit 141, the control unit 160 unlocks the first touch screen unit 141, and when an atypical touch has been input through the second touch screen unit 142, the control unit 160 locks the second touch screen unit 142. If the second touch screen unit 142 had been in a lock state, the atypical touch would not have any effect. In FIG. 16, an embodiment is described in which step S1604 is performed after step S1602 and step S1603. However, step S1602 and step S1603 may be performed simultaneously with step S1604, or step S1604 may be performed before step S1602 and step S1603.

In FIG. 16, a case has been described in which a lock touch or an unlock touch is input through the first touch screen unit 141 and an atypical touch is input through the second touch screen unit 142. However, a lock touch or an unlock touch may be input through the second touch screen unit 142, and an atypical touch may be input through the first touch screen unit 141.

Figure 17A:
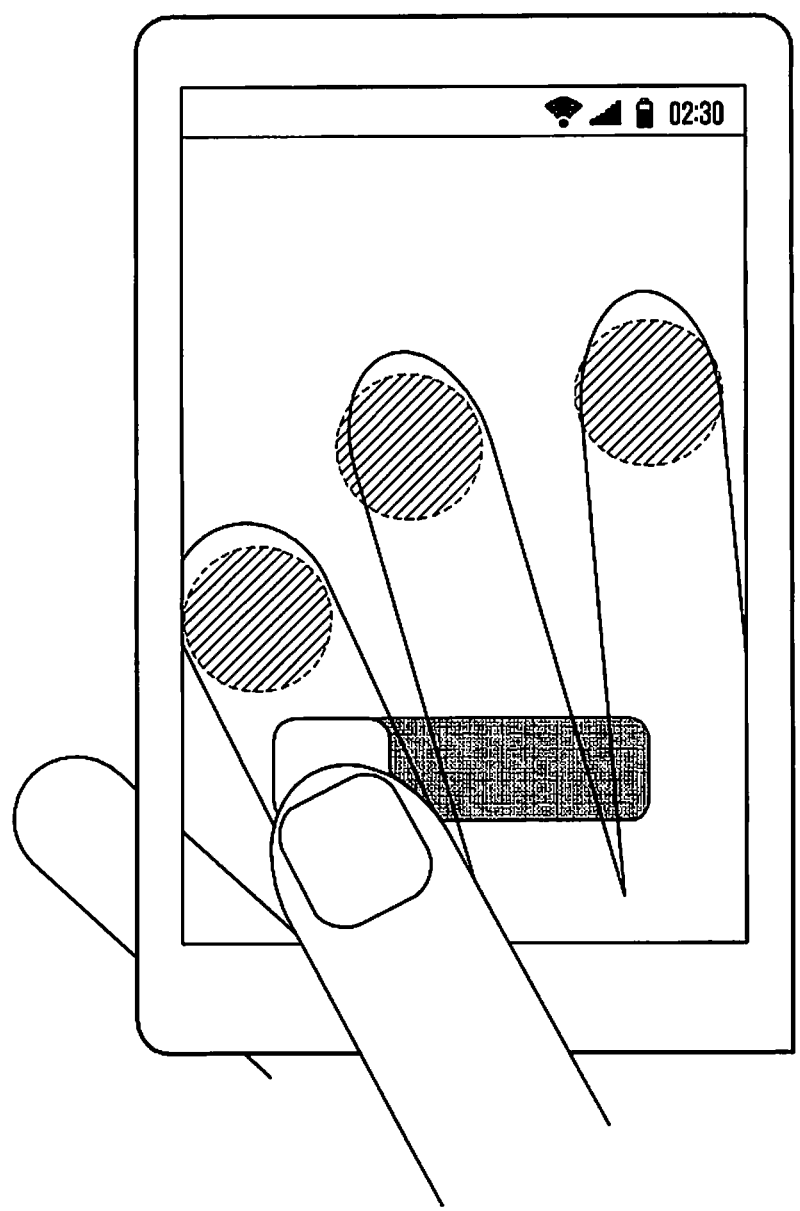
FIGS. 17A and 17B are views illustrating an example of locking a display of a portable terminal in the process illustrated in FIG. 16, according to an embodiment of the present invention.
Figure 17B:
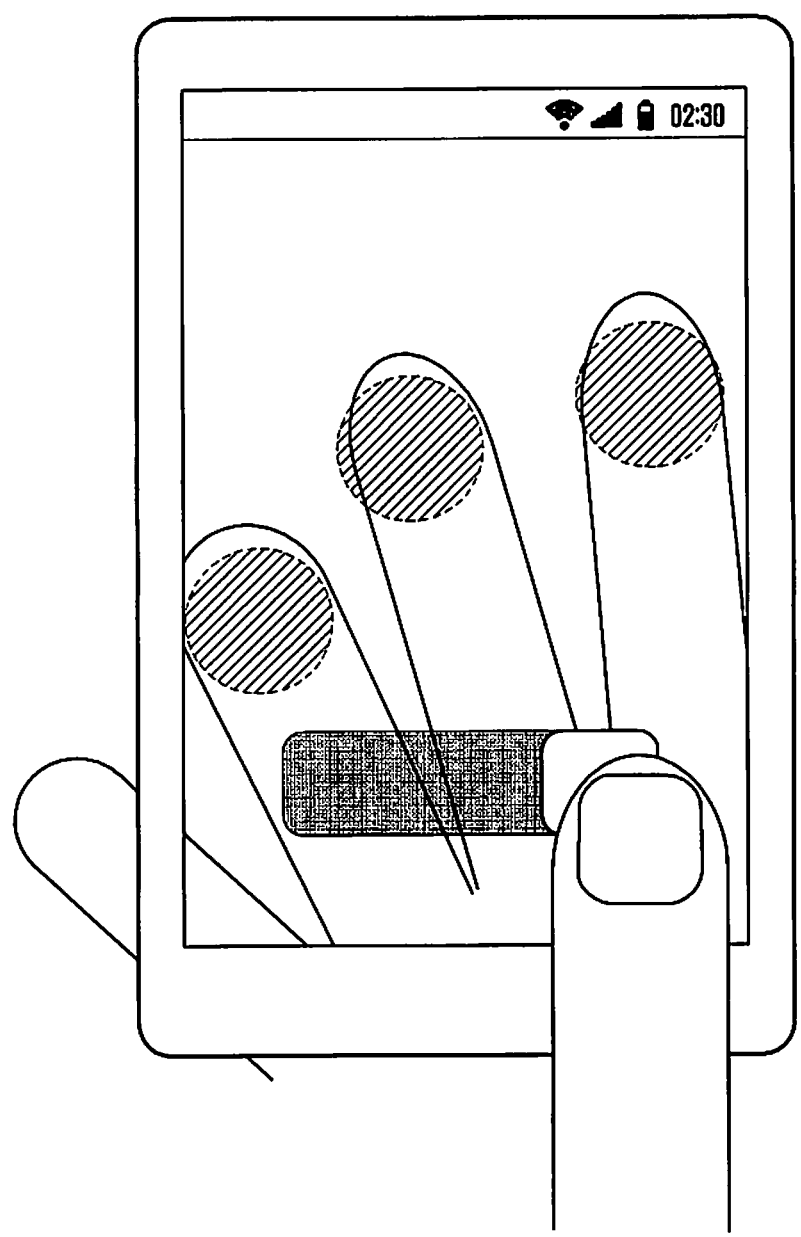

FIGS. 17A and 17B are views illustrating an example of locking a display of a portable terminal in the process illustrated in FIG. 16, according to an embodiment of the present invention.

Referring to FIG. 17A illustrates a display of a portable terminal before a lock touch or an unlock touch is input through the first touch screen unit 141 and an atypical touch is input through the second touch screen unit 142.

Referring to FIG. 17B, the first touch screen unit 141 is changed from a lock state to an unlock state according to a touch on a lock/unlock area through the first touch screen unit 141, and the second touch screen unit 142 is changed from the unlock state to the lock state according to an atypical touch. If the second touch screen unit 142 had been in the lock state, the atypical touch would not have any effect.

Figure 18:
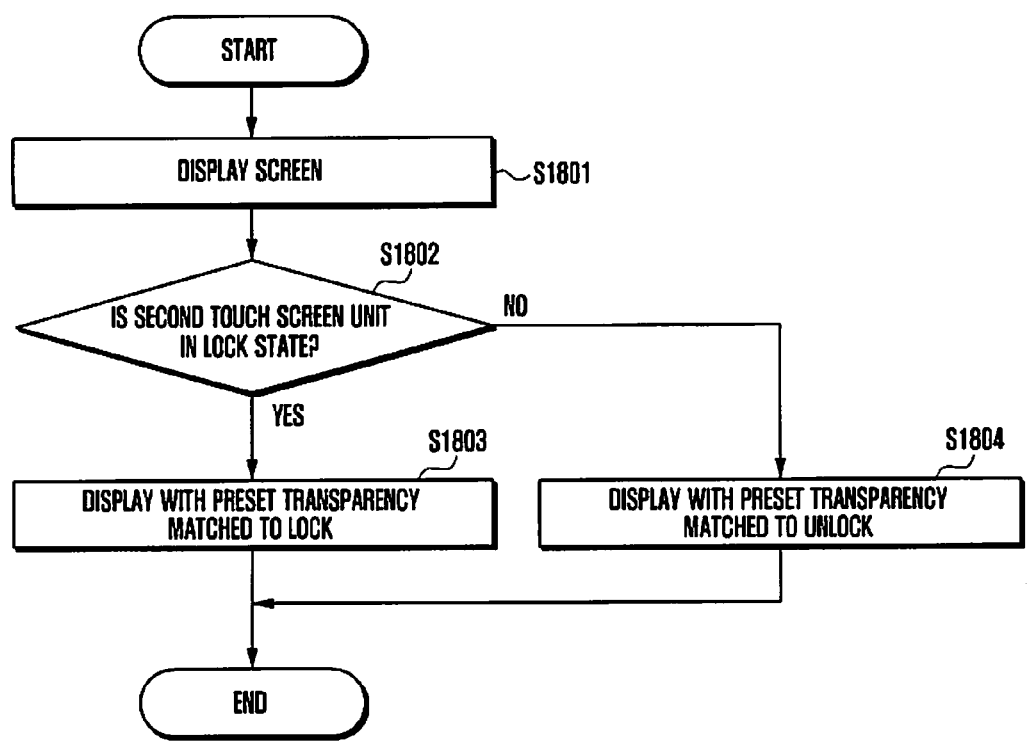
FIG. 18 is a flowchart illustrating a process for applying a preset transparency of a portable terminal according to an embodiment of the present invention.

FIG. 18 is a flowchart illustrating a process for applying a preset transparency of a portable terminal according to an embodiment of the present invention. Referring to FIG. 18, in step S1801, when the user turns power on through the input unit 120, the control unit 160 displays an initial screen. Here, the control unit 160 displays, on one side of the transparent display unit 140, a lock/unlock area capable of locking or unlocking the first touch screen unit 141 and the second touch screen unit 142 regardless of the lock or unlock of the first touch screen unit 141 and that of the second touch screen unit 142.

In step S1802, the control unit 160 determines whether the second touch screen unit 142 is in a lock state. When it is determined in step S1802 that the second touch screen unit 142 is in the lock state, in step S1803, the control unit 160 controls the transparent display unit 140 to be displayed with a preset transparency matched to the lock state. When it is determined in step S1802 that the second touch screen unit 142 is in an unlock state, in step S1804, the control unit 160 controls the transparent display unit 140 to be displayed with a preset transparency matched to the unlock state.

Herein, the control unit 160 displays a transparency matched to the lock state of the second touch screen unit 142 in a nearly opaque state and displays a transparency matched to the unlock of the second touch screen unit 142 in a nearly transparent state. For example, when the second touch screen unit 142 is in the lock state, the user may control the transparent display unit 140 to be displayed in a nearly transparent state. When the second touch screen unit 142 is in the unlock state, the user may control the transparent display unit 140 to be displayed in a nearly opaque state. However, the transparency of the transparent display unit 140 can be displayed according to the intuition of the user by displaying the unlock state associated with transparentness and by displaying the lock state associated with opacity.

FIGS. 19A to 19D are views illustrating an example of displaying a transparency of a display of a portable terminal in the process illustrated in FIG. 18, according to an embodiment of the present invention.

Figure 19A:
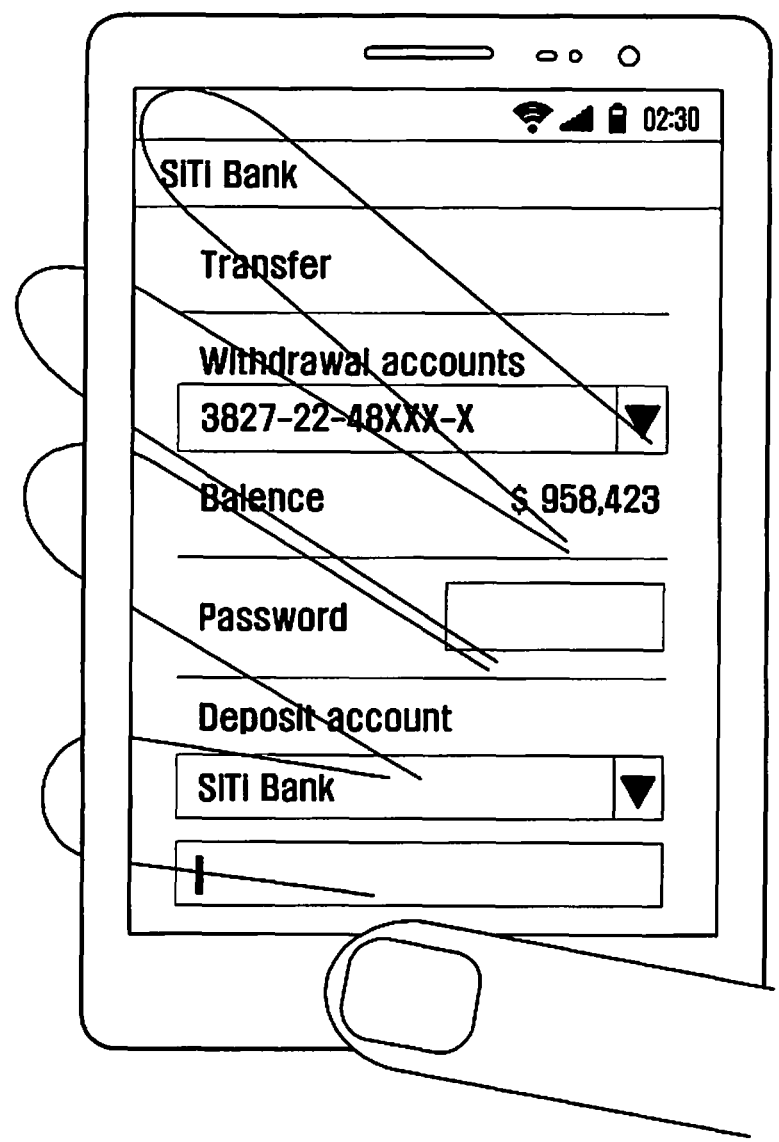
FIGS. 19A to 19D are views illustrating an example of displaying a transparency of a display of a portable terminal in the process illustrated in FIG. 18, according to an embodiment of the present invention.

Referring to FIG. 19A, the entire area of the transparent display unit 140 is displayed in a transparent state or in a translucent state when the second touch screen unit 142 is in an unlock state. By allowing the user to visually perceive the transparency of the transparent display unit 140 as described above, the user recognizes that the user is capable of inputting a touch through the second touch screen unit 142. In FIG. 19A, the second touch screen unit 142 is in the unlock state, and the first touch screen unit 141 is also set to the unlock state, because a touch is more frequently input through the first touch screen unit 141 than through the second touch screen unit 142. However, the first touch screen unit 141 does not need to be in the unlock state.

Figure 19B:
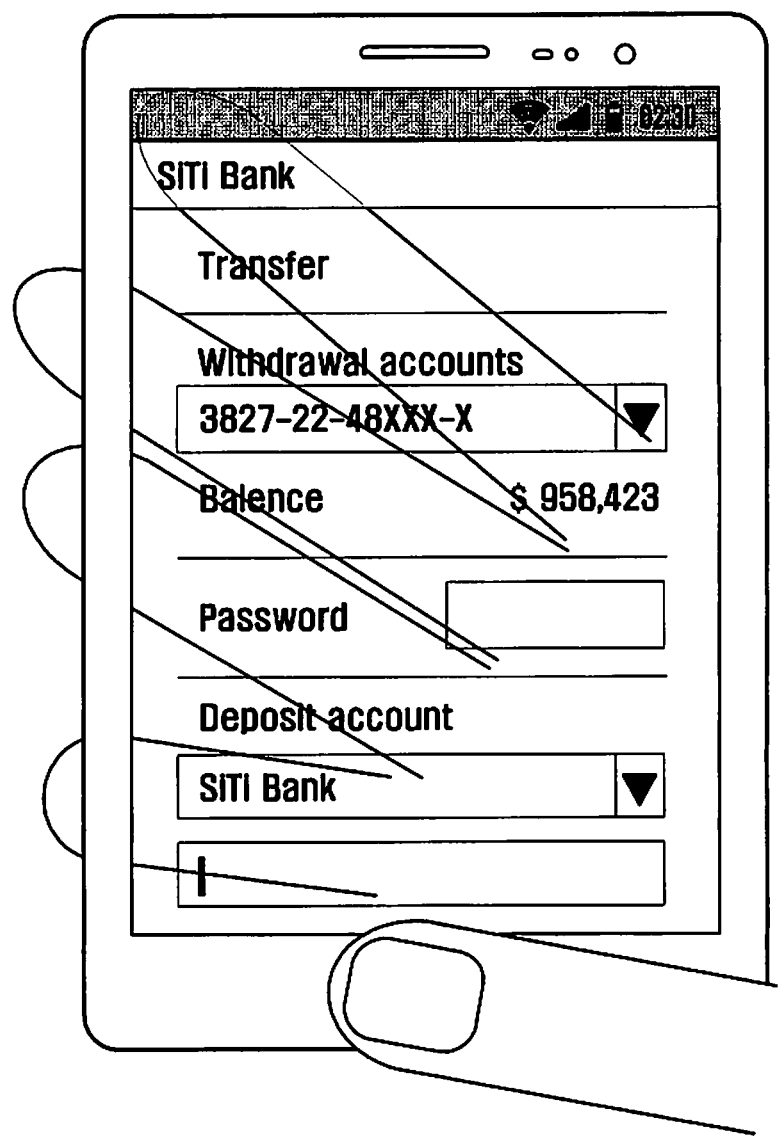

Referring to FIG. 19B, a partial area of the transparent display unit 140 is displayed opaquely or with a low transparency when the second touch screen unit 142 is in a lock state. For example, only the indicator area 830 may be displayed in a nearly opaque state regardless of a transparency of the execution information display area 820, and thereby the second touch screen unit 142 may be visually represented as being in the lock state.

Figure 19C:
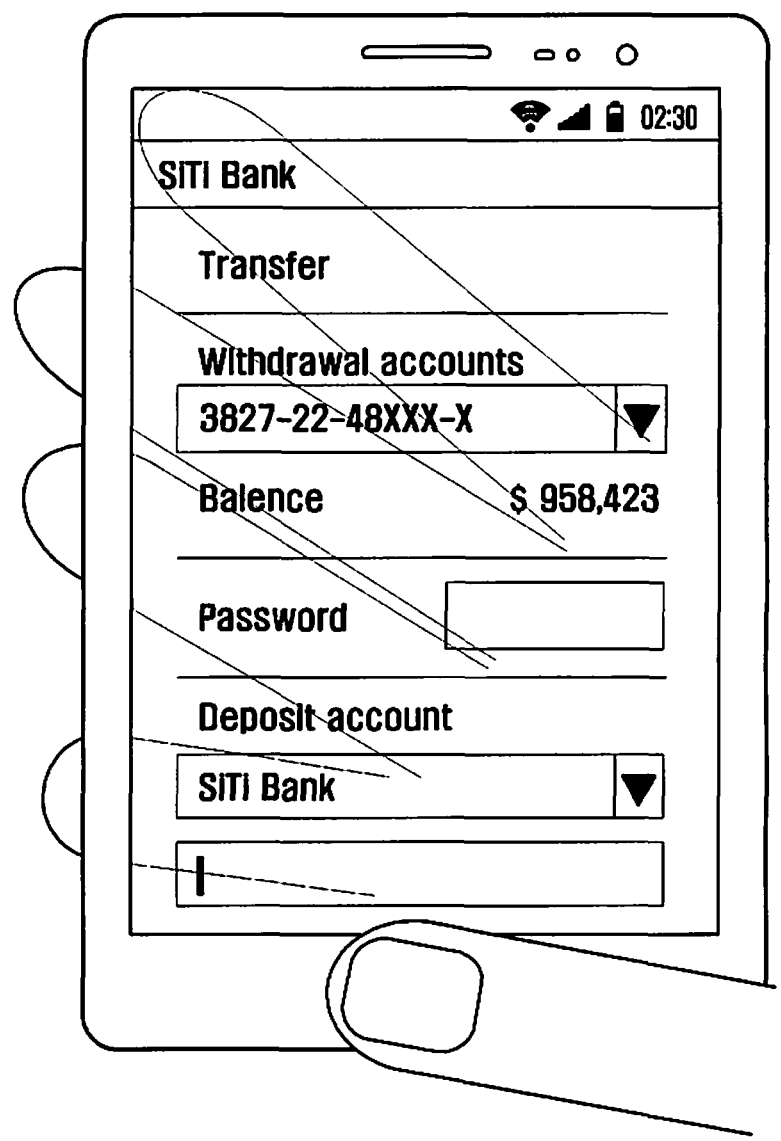

Referring to FIG. 19C, the entire area of the transparent display unit 140 is displayed in a nearly opaque state when the second touch screen unit 142 is in the lock state. In FIG. 19C, because a transparency of the transparent display unit 140 is nearly opaque and the fingers of the user on the rear surface of the transparent display unit 140 cannot be seen through the transparent display unit 140, the user has difficulty in inputting a touch through the second touch screen unit 142.

Figure 19D:
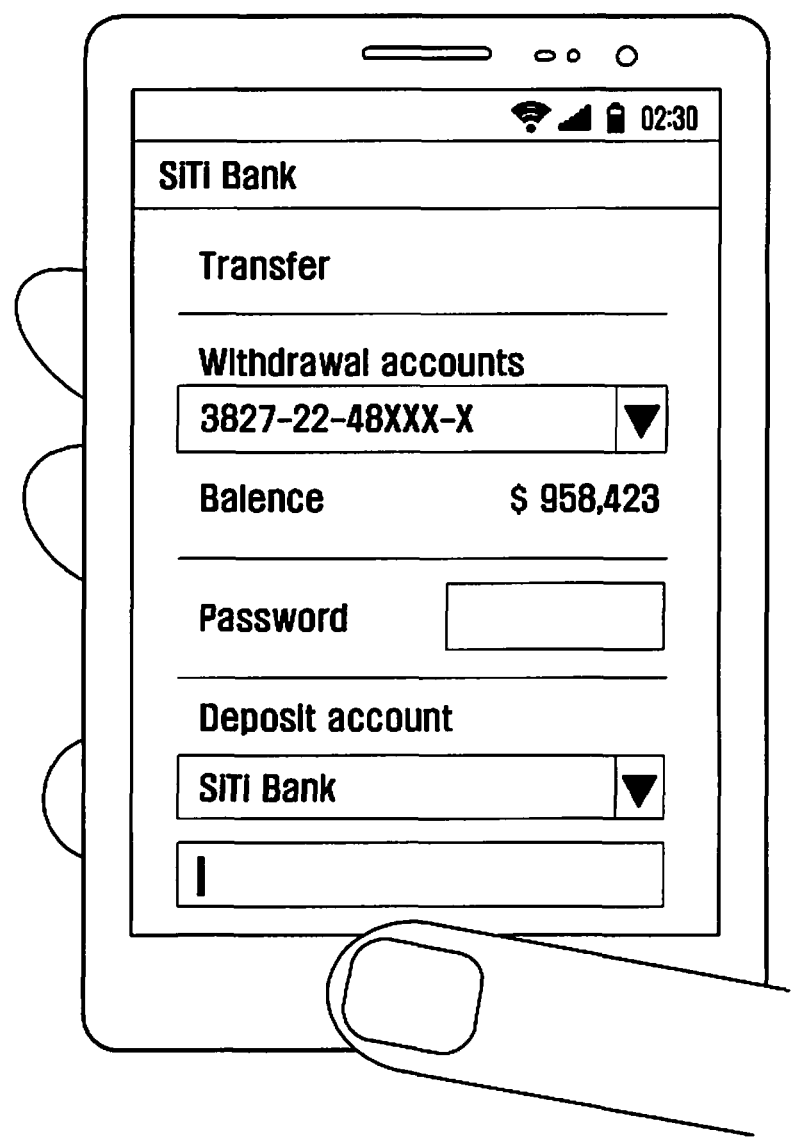

Referring to FIG. 19D, the entire area of the transparent display unit 140 is displayed opaquely when the second touch screen unit 142 is in the lock state. In FIG. 19D, a case in which the second touch screen unit 142 is in the lock state is visually represented. A preset transparency is represented by using a value selected from among consecutive values between a value representing transparentness and a value representing opacity. With respect to the preset transparency, the user may selectively change a desired transparency value through a UI in a setting menu which has consecutively-changed transparency values, or may selectively change the desired transparency value by using transparency values stored by default. Alternatively, the transparency of only the partial area of the transparent display unit 140 may be displayed as illustrated in FIG. 19B, and thereby the user can recognize the preset transparency.

Hereinabove, although the method and the apparatus for controlling lock or unlock in the portable terminal having the transparent display according to the embodiments of the present invention have been described through this specification and the accompanying drawings by using the particular terms, the terms are merely used in their common meanings in order to clearly describe the technical contents of the present invention and help understanding of the embodiments of the present invention. Therefore, the present invention is not limited to the above-described embodiments. It is obvious to those skilled in the art that various embodiments can be implemented based on the technical idea of the present invention.

As described above, the method and the apparatus for controlling lock or unlock in the portable terminal according to embodiments of the present invention provide an intuitive locking apparatus. Accordingly, the user can conveniently set the lock or unlock of touch screens on both side of the transparent display or that of a touch screen on any one side thereof.

According to embodiments of the present invention, a corresponding transparency according to the lock state and unlock state of the transparent display of the portable terminal is intuitively displayed on the transparent display thereof, and the user can easily know whether the screen of the transparent display is set to the lock state or unlock state. Accordingly, the convenience of the user can be increased.

According to embodiments of the present invention, when the user turns the portable terminal over, a lock state or an unlock state of the first touch screen unit and that of the second touch screen unit are automatically and mutually reversed, and the lock state or unlock state before the user turns the portable terminal over is maintained. Accordingly, the convenience of the user can be increased.

According to embodiments of the present invention, the portable terminal having the transparent display can automatically change a gripped surface thereof, that the user grips and contacts, to a lock state, and can remove the malfunction of the transparent display. Accordingly, the user can stably use the portable terminal having the transparent display.

What is claimed is:

1. A method for controlling to lock or unlock in a portable terminal having a transparent double-sided display, the method comprising:
    activating the transparent double-sided display according to a lock state or an unlock state of the transparent double-sided display, wherein the transparent double-sided display is capable of receiving a touch input on a first display surface and a second display surface;
    displaying a lock or unlock area, which notifies whether a display surface is locked, in a preset area of at least one of display surfaces of the transparent double-sided display;
    changing the lock state or the unlock state of the at least one of the display surfaces of the transparent double-sided display and displaying whether the changed state is the lock state or the unlock state in the lock or unlock area of the at least one display surface, when a touch input is received in the lock or unlock area; and
    setting a preset transparency for the transparent double-sided display differently, based on the lock state or the unlock state of the at least one of the display surfaces.

2. The method of claim 1, wherein the preset area is disposed at any one position of an upper end, a lower end, a left side, a right side, and a center of the at least one of display surfaces of the transparent double-sided display.

3. The method of claim 2, wherein the touch input in the lock or unlock area corresponds to any one of a drag from the upper end to the lower end, a drag from the lower end to the upper end, a drag from the left side to the right side, a drag from the right side to the left side, and a touch in the lock or unlock area.

4. The method of claim 1, wherein the transparent double-sided display is displayed so as to have a preset first transparency if the both side surfaces of the transparent double-sided display are in the unlock state, the transparent double-sided display is displayed so as to have a preset second transparency if one of the both side surfaces of the transparent double-sided display is in the unlock state, and the transparent double-sided display is displayed so as to have a preset third transparency if the both side surfaces thereof are in the lock state.

5. The method of claim 4, wherein the first transparency has a higher value than a value of the second transparency, and the second transparency has a higher value than a value of the third transparency.

6. The method of claim 1, further comprising changing a lock state of the first display surface of the transparent double-sided display to an unlock state and changing an unlock state of the second display surfaces of the transparent double-sided display to a lock state, if rotation in which the first display surface and the second display surface of the transparent double-sided display are reversed is detected when the first display surface of the transparent double-sided display is in the lock state and the second display surface of the transparent double-sided display is in the unlock state.

7. The method of claim 1, further comprising changing an unlock state of the at least one of the display surfaces of the transparent double-sided display to a lock state, if an atypical touch is input to the at least one of the display surfaces of the transparent double-sided display in the unlock state when the at least one of the display surfaces of the transparent double-sided display is in the unlock state.

8. The method of claim 1, further comprising generating a corresponding effect sound when the lock state or the unlock state of the at least one of the display surfaces of the transparent double-sided display is changed.

9. An apparatus for controlling to lock or unlock in a portable terminal, the apparatus comprising:
a transparent double-sided display that has two display surfaces and is capable of receiving a touch input on a first display surface and a second display surface;
a memory configured to store a lock state or an unlock state of each surface of the transparent double-sided display; and
a control unit configured to read the lock state or the unlock state of the transparent double-sided display from the memory, to activate the transparent double-sided display according to the lock state and the unlock state of the transparent double-sided display, to display a lock or unlock area, which notifies whether a display surface is locked in a preset area of at least one of the display surfaces of the transparent double-sided display, to change the lock state or the unlock state of the at least one of the display surfaces of the transparent double-sided display and to display whether the changed state is the lock state or the unlock state in the lock or unlock area of the at least one display surface, when a touch input is received in the lock or unlock area, and to set a preset transparency for the transparent double-sided display differently, based on the lock state or the unlock state of the at least one of the display surfaces.

10. The apparatus of claim 9, wherein the preset area is disposed at any one position of an upper end, a lower end, a left side, a right side, and a center of the at least one of display surfaces of the transparent double-sided display.

11. The apparatus of claim 10, wherein the touch input in the lock or unlock area corresponds to any one of a drag from the upper end to the lower end of the transparent double-sided display, a drag from the lower end to the upper end of the transparent double-sided display, a drag from the left side to the right side of the transparent double-sided display, a drag from the right side to the left side of the transparent double-sided display, and a touch in the lock or unlock area of the transparent double-sided display.

12. The apparatus of claim 9, wherein the control unit is configured to control the transparent double-sided display to have a preset first transparency if the two display surfaces of the transparent double-sided display are in the unlock state, to control the transparent double-sided display to have a preset second transparency if one of the two display surfaces of the transparent double-sided display is in the unlock state, and to control the transparent double-sided display to have a preset third transparency if the two display surfaces thereof are in the lock state.

13. The apparatus of claim 12, wherein the first transparency has a higher value than a value of the second transparency, and the second transparency has a higher value than a value of the third transparency.

14. The apparatus of claim 9, further comprising a motion sensor configured to detect rotation of the first display surface of the transparent double-sided display and the second display surface of the transparent double-sided display
wherein the control unit is configured to change a lock state of the first display surface of the transparent double-sided display to an unlock state and to change an unlock state of the second display surface of the transparent double-sided display to a lock state, if the rotation in which the first display surface and the second display surface of the transparent double-sided display are reversed is detected through the motion sensor when the first display surface of the transparent double-sided display is in the lock state and the second display surface of the transparent double-sided display is in the unlock state.

15. The apparatus of claim 9, wherein the control unit is configured to change an unlock state of the at least one of the display surfaces of the transparent double-sided display to the lock state, if an atypical touch is input to the at least one of the display surfaces of the transparent double-sided display in the unlock state when the at least one of the display surfaces of the transparent double-sided display is in the unlock state.

16. The apparatus of claim 9, further comprising an audio processing unit configured to generate a corresponding effect sound when the lock state or the unlock state of the at least one of the display surfaces of the transparent double-sided display is changed.

17. The apparatus of claim 9, further comprising a wireless communication unit configured to create a communication channel for a voice call, a video call, data communication, or network connection.

18. A method for controlling to lock or unlock in a portable terminal having a double-sided transparent display, the method comprising:
activating the transparent double-sided display according to a lock state or an unlock state of the transparent double-sided display, wherein the transparent double-sided display is capable of receiving a touch input on a first display surface and a second display surface;
displaying a lock or unlock area, which notifies whether a display surface is locked, in a preset area of the first display surface;
receiving a touch input on the second display in an area corresponding to the lock or unlock area;
changing the lock state or the unlock state of the first display surface;
displaying whether the changed state is the lock state or the unlock state in the lock or unlock area of the first display surface, in response to the touch input received on the second display surface; and
setting a preset transparency for the transparent double-sided display differently, based on the lock state or the unlock state of at least one of the display surfaces.

* * * * *